United States Patent
Iwasaki et al.

(10) Patent No.: US 10,894,874 B2
(45) Date of Patent: Jan. 19, 2021

(54) CRYSTAL NUCLEATOR FOR POLYOLEFIN RESINS, METHOD FOR PRODUCING CRYSTAL NUCLEATOR FOR POLYOLEFIN RESINS, AND METHOD FOR IMPROVING FLUIDITY OF CRYSTAL NUCLEATOR FOR POLYOLEFIN RESINS

(71) Applicant: NEW JAPAN CHEMICAL CO., LTD., Kyoto (JP)

(72) Inventors: Shohei Iwasaki, Kyoto (JP); Yohei Uchiyama, Kyoto (JP); Kazuya Matsumoto, Kyoto (JP); Takayuki Maeda, Kyoto (JP)

(73) Assignee: NEW JAPAN CHEMICAL CO., LTD., Kyoto (JP)

( * ) Notice: Subject to any disclaimer, the term of this patent is extended or adjusted under 35 U.S.C. 154(b) by 61 days.

(21) Appl. No.: 16/328,002

(22) PCT Filed: Aug. 8, 2017

(86) PCT No.: PCT/JP2017/028740
§ 371 (c)(1),
(2) Date: Feb. 25, 2019

(87) PCT Pub. No.: WO2018/037908
PCT Pub. Date: Mar. 1, 2018

(65) Prior Publication Data
US 2019/0194422 A1    Jun. 27, 2019

(30) Foreign Application Priority Data

Aug. 25, 2016  (JP) .................... 2016-164310
Feb. 14, 2017  (JP) .................... 2017-024523
Mar. 6, 2017   (JP) .................... 2017-041665
May 19, 2017   (JP) .................... 2017-099452

(51) Int. Cl.
| | | |
|---|---|---|
| *C08K 5/1575* | (2006.01) | |
| *C08K 5/053* | (2006.01) | |
| *C08K 5/00* | (2006.01) | |
| *C08L 23/02* | (2006.01) | |
| *C08K 3/36* | (2006.01) | |
| *C08K 5/098* | (2006.01) | |
| *C08K 9/00* | (2006.01) | |

(52) U.S. Cl.
CPC .......... *C08K 5/1575* (2013.01); *C08K 5/0083* (2013.01); *C08K 5/053* (2013.01); *C08L 23/02* (2013.01); *C08K 3/36* (2013.01); *C08K 5/098* (2013.01); *C08K 9/00* (2013.01); *C08K 2201/003* (2013.01); *C08K 2201/005* (2013.01); *C08K 2201/016* (2013.01); *C08L 2205/24* (2013.01)

(58) Field of Classification Search
CPC ...... C08K 5/1575; C08K 9/00; C08K 5/0083; C08L 23/02

USPC .......................................................... 524/108
See application file for complete search history.

(56) References Cited

U.S. PATENT DOCUMENTS

| | | |
|---|---|---|
| 5,198,484 A | 3/1993 | Mannion |
| 6,245,843 B1 | 6/2001 | Kobayashi et al. |
| 6,417,254 B1 | 7/2002 | Kobayashi |
| 2002/0028864 A1 | 3/2002 | Kobayashi et al. |
| 2003/0109610 A1* | 6/2003 | Nomoto ................ C08K 5/36 524/108 |
| 2006/0173108 A1 | 8/2006 | Xu et al. |
| 2011/0105657 A1 | 5/2011 | Tanji et al. |
| 2012/0296018 A1 | 11/2012 | Haruna et al. |
| 2016/0115295 A1 | 4/2016 | Yamazaki et al. |

FOREIGN PATENT DOCUMENTS

| | | |
|---|---|---|
| EP | 1375583 A1 | 1/2004 |
| JP | S51122150 A | 10/1976 |
| JP | S5721440 A | 2/1982 |
| JP | S5947705 B2 | 11/1984 |
| JP | S60-101131 A | 6/1985 |
| JP | H06-145431 A | 5/1994 |
| JP | H06145431 A | 5/1994 |
| JP | H07032454 A | 2/1995 |
| JP | H08-245843 A | 9/1996 |
| JP | 2001-81236 A | 3/2001 |
| JP | 2001-240698 A | 9/2001 |
| JP | 2002-332359 A | 11/2002 |

(Continued)

OTHER PUBLICATIONS

International Search Report issued in International Application No. PCT/JP2017/028740; dated Oct. 31, 2017 (1 page).

(Continued)

*Primary Examiner* — Hui H Chin
(74) *Attorney, Agent, or Firm* — Osha Bergman Watanabe & Burton LLP

(57) ABSTRACT

The present invention aims to provide a method for improving the fluidity of a crystal nucleating agent for polyolefin resins without impairing other properties, and a polyolefin resin composition containing the crystal nucleating agent with improved fluidity and having excellent properties including transparency, and a molded article thereof. A crystal nucleating agent controlled to have specific characteristics can achieve improved fluidity, and the use of such a crystal nucleating agent having specific characteristics remarkably improves the workability during molding processing and provides a polyolefin resin composition excellent in properties such as transparency, and a molded article thereof.

19 Claims, No Drawings

(56) References Cited

FOREIGN PATENT DOCUMENTS

| | | |
|---|---|---|
| JP | 2003-096246 A | 4/2003 |
| JP | 2007-297465 A | 11/2007 |
| JP | 2009-507982 A | 2/2009 |
| JP | 2009507982 A | 2/2009 |
| JP | 2010275535 A | 12/2010 |
| JP | 2011207991 A | 10/2011 |
| JP | 2013-209662 A | 10/2013 |
| JP | 2015-30849 A | 2/2015 |
| JP | 5920524 B2 | 5/2016 |
| JP | 2016-121303 A | 7/2016 |
| WO | 98/33851 A1 | 8/1998 |
| WO | 9833851 A1 | 8/1998 |
| WO | 9918108 A1 | 4/1999 |
| WO | 02077094 A1 | 10/2002 |
| WO | 2007032797 A1 | 3/2007 |
| WO | 2009139350 A1 | 11/2009 |
| WO | 2011122264 A1 | 10/2011 |
| WO | 2014192812 A1 | 12/2014 |
| WO | 2016/088767 A1 | 6/2016 |

OTHER PUBLICATIONS

Written Opinion of the International Searching Authority issued in International Application No. PCT/JP2017/028740; dated Oct. 31, 2017 (3 pages).
International Search Report issued in International Application No. PCT/JP2017/033009, dated Oct. 31, 2017 (2 pages).
Written Opinion issued in International Application No. PCT/JP2017/033009; dated Oct. 31, 2017 (3 pages).
Extended European Search Report issued in European Application No. 17850911.3, dated Apr. 8, 2020 (11 pages).
Office Action issued in corresponding Japanese Application No. 2016181073; dated Dec. 24, 2019 (15 pages).
Office Action issued in U.S. Appl. No. 16/333,387, dated Oct. 13, 2020 (29 pages).

* cited by examiner

CRYSTAL NUCLEATOR FOR POLYOLEFIN RESINS, METHOD FOR PRODUCING CRYSTAL NUCLEATOR FOR POLYOLEFIN RESINS, AND METHOD FOR IMPROVING FLUIDITY OF CRYSTAL NUCLEATOR FOR POLYOLEFIN RESINS

TECHNICAL FIELD

The present invention relates to improvement of the fluidity of a crystal nucleating agent for polyolefin resins. Specifically, the present invention relates to a method for improving the fluidity, a method for producing a crystal nucleating agent for polyolefin resins with improved fluidity including the above method, a crystal nucleating agent for polyolefin resins with improved fluidity obtained by the method, and a highly transparent polyolefin resin composition and a molded article thereof each prepared using the crystal nucleating agent.

BACKGROUND ART

Polyolefin resins such as polyethylene or polypropylene are inexpensive and have well-balanced properties, and therefore are used for various applications as general-purpose plastics. Polyolefin resins are commonly crystalline and are often used together with a crystal nucleating agent with an aim of improving the production efficiency or with an aim of improving the mechanical properties, thermal properties, and optical properties. In particular, the use of a crystal nucleating agent is essential for improvement of the transparency that is an optical property.

The crystal nucleating agent is classified as an inorganic crystal nucleating agent (e.g., talc) or an organic crystal nucleating agent (e.g., a diacetal compound, a metal salt of a carboxylic acid or a phosphoric acid ester). The organic crystal nucleating agent is further classified as a soluble crystal nucleating agent or an insoluble crystal nucleating agent. For improvement of the optical properties such as transparency, a soluble organic crystal nucleating agent typified by the diacetal compound is particularly effective and is often used.

Recently, improvement of productivity has been increasingly pursued for general-purpose plastics. As a part of this, improvement of the feeding property of raw materials, that is, the fluidity of raw materials, has also been pursued. The major bottleneck for the improvement of productivity is the poor fluidity of crystal nucleating agents, particularly diacetal compounds.

Various efforts therefore have been made on improvement of the fluidity of a crystal nucleating agent including diacetal compounds. For example, methods for improving the fluidity by granulation (Patent Literatures 1 to 4) and methods for improving the fluidity not by granulation but by adding a fluidity improver (Patent Literatures 5 to 8) have been proposed.

The former methods, which include granulation, improve the fluidity but tend to decrease the dispersibility or solubility in polyolefin resins. This may cause not only the problem of lowering the original performance of the nucleating agent, such as transparency, but also problems in relation to the appearance, such as white spots. Additives such as a binder are thus commonly added, and such addition of additives is widely employed. In some applications, however, the addition of additives such as a binder may not completely solve the above problems. The additives such as a binder also may problematically affect the performance of the crystal nucleating agent.

The latter methods, which include addition of a fluidity improver without granulation, are effective in improvement of fluidity, and unlike the methods including granulation hardly cause the dispersibility problem. These methods thus have been used in various applications. At present, however, the addition of a fluidity improver alone fails to provide sufficient fluidity in applications that require high fluidity.

The performance of a crystal nucleating agent is known to heavily depend on its dispersibility or solubility in resin. Various efforts therefore have been made on improvement of the dispersibility or solubility in resin. For example, methods using multiple nucleating agents and methods including adding an additive for improving the dispersibility or solubility (Patent Literatures 9 to 11) have been proposed and in practical use. Other effective methods include method including reducing the particle size, that is, forming the crystal nucleating agent into fine particles (Patent Literature 12), and these methods have been widely used.

In some applications, however, the first methods, which include adding an additive, may cause a new problem such as bleeding due to the additive. The second methods, which include forming the crystal nucleating agent into fine particles, provide very high dispersibility, but may cause handling problems such as low transportability.

It is known that a high bulk density typically leads to a high fluidity. One of the reasons why granulation improves the fluidity is said to be that granulation greatly increases the bulk density. The methods including granulation, however, unavoidably decrease the dispersibility or solubility in resin as describe above, and thus require an additive such as a binder. If it is impossible to add enough binder, the degree of granulation has to be decreased to maintain the dispersibility or solubility. In such a case, granulation unfortunately may not provide a sufficient fluidity-improving effect. Thus, there is a demand for development of a method, other than the methods including granulation, for increasing the bulk density to improve the fluidity without impairing the dispersibility or solubility.

CITATION LIST

Patent Literature

Patent Literature 1: WO 98/33851
Patent Literature 2: JP 2001-81236 A
Patent Literature 3: JP 2002-332359 A
Patent Literature 4: JP 2003-096246 A
Patent Literature 5: JP 2009-507982 T
Patent Literature 6: JP 2013-209662 A
Patent Literature 7: JP 2015-30849 A
Patent Literature 8: JP 5920524 B
Patent Literature 9: JP S60-101131 A
Patent Literature 10: JP H08-245843 A
Patent Literature 11: JP 2001-240698 A
Patent Literature 12: JP H06--145431 A

SUMMARY OF INVENTION

Technical Problem

The present invention aims to provide a method for improving the fluidity of a crystal nucleating agent for polyolefin resins while maintaining excellent dispersibility, a method for producing a crystal nucleating agent for polyolefin resins with improved fluidity including the above method, a crystal nucleating agent for polyolefin resins excellent in fluidity as well as dispersibility produced by the method, and a highly transparent polyolefin resin composition and a molded article thereof each including the crystal nucleating agent.

Solution to Problem

The present inventors made intensive studies to find out that adjusting crystal nucleating agent particles to have specific characteristics can improve the fluidity and the dispersibility at the same time. Specifically, the inventors found out that a crystal nucleating agent or crystal nucleating agent mixture in a fine particle form with a specific particle shape can satisfy the fluidity and the dispersibility at the same time. The inventors thus completed the present invention.

The present invention provides a method for improving the fluidity of a crystal nucleating agent for polyolefin resins while at the same time improving the dispersibility, a crystal nucleating agent for polyolefin resins excellent in fluidity as well as dispersibility obtained by the method, and a polyolefin resin composition and a molded article thereof each containing the crystal nucleating agent.

The present invention relates to a crystal nucleating agent for polyolefin resins, the crystal nucleating agent at least containing a crystal nucleating agent (A), wherein the crystal nucleating agent for polyolefin resins has an average particle size of 0.5 to 4.0 μm and a particle size uniformity of 3 to 10 as determined by laser diffraction particle size distribution measurement.

The crystal nucleating agent (A) preferably has a 50% value of an aspect ratio of 0.40 to 0.70 and a lower value of the aspect ratio of 0.2 to 0.4 as determined by particle image analysis.

The crystal nucleating agent for polyolefin resins of the present invention is preferably a pulverized product prepared with a jet pulverizer.

The crystal nucleating agent (A) is preferably a mixture of a crystal nucleating agent (B) having an average particle size of 0.5 to 2.0 μm as determined by laser diffraction particle size distribution measurement and a crystal nucleating agent (C) having an average particle size of 4.0 to 15.0 μm as determined by laser diffraction particle size distribution measurement.

The crystal nucleating agent (B) is preferably a pulverized product prepared with a jet pulverizer Preferably, the crystal nucleating agent (A) is a diacetal compound represented by the following formula (1); or in cases where the crystal nucleating agent (A) is a mixture of the crystal nucleating agent (B) and the crystal nucleating agent (C), at least one of the crystal nucleating agent (B) or the crystal nucleating agent (C) is a diacetal compound represented by the formula (1):

[Chem. 1]

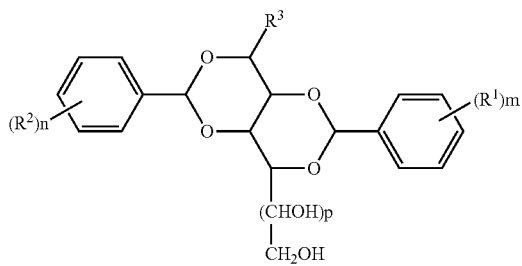

(1)

wherein $R^1$ and $R^2$ are the same as or different from each other and each represent a hydrogen atom, a C1-C4 linear or branched alkyl group, a C1-C4 linear or branched alkoxy group, a C1-C4 linear or branched alkoxy carbonyl group, or a halogen atom; $R^3$ represents a hydrogen atom, a C1-C4 linear or branched alkyl group, a C2-C4 linear or branched alkenyl group, or a C1-C4 linear or branched hydroxy alkyl group; m and n each represent an integer of 1 to 5; p represents 0 or 1; and two $R^1$s optionally bind to each other to form a tetralin ring together with a benzene ring to which they are bonded and two $R^2$s optionally bind to each other to form a tetralin ring together with a benzene ring to which they are bonded.

Preferably, in the formula (1), $R^1$ and $R^2$ are the same as or different from each other and each represent a methyl group or an ethyl group, $R^3$ represents a hydrogen atom, m and n each represent an integer of 1 or 2, and p represents 1.

Preferably, in the formula (1), $R^1$ and $R^2$ are the same as or different from each other and each represent a propyl group or a propoxy group, $R^3$ represents a propyl group or a propenyl group, m and n each represent 1, and p represents 1.

The crystal nucleating agent for polyolefin resins of the present invention preferably has an aerated bulk density of 0.20 g/cm$^3$ or higher and a packed bulk density of 0.30 g/cm$^3$ or higher.

The crystal nucleating agent for polyolefin resins of the present invention is preferably a volume-reduced product of a pulverized product prepared with a jet pulverizer.

The crystal nucleating agent for polyolefin resins of the present invention preferably further contains a fluidity improver, wherein the fluidity improver is at least one selected from the group consisting of a metal salt of a C8-C32 saturated or unsaturated fatty acid, a C14-C32 saturated or unsaturated fatty acid, a C14-C28 saturated or unsaturated aliphatic alcohol, a bisamide of a C12-C32 saturated or unsaturated fatty acid, silica, talc, calcium carbonate, and hydrotalcite.

The fluidity improver preferably contains a metal salt of a 08-C32 saturated or unsaturated fatty acid and/or silica.

The present invention also relates to a method for producing a crystal nucleating agent for polyolefin resins, including (i) pulverization with a jet pulverizer to an average particle size of 0.5 to 4.0 μm and a particle size uniformity of 3 to 10.

The method for producing a crystal nucleating agent for polyolefin resins of the present invention preferably includes (ii) subjecting the pulverized product obtained in the step (i) to volume-reducing treatment to an aerated bulk density of 0.20 g/cm$^3$ or higher and a packed bulk density of 0.30 g/cm$^3$ or higher.

In the step (i), a crystal nucleating agent (A) in the obtained pulverized product preferably has a 50% value of an aspect ratio of 0.40 to 0.70 and a lower value of the aspect ratio of 0.2 to 0.4 as determined by particle image analysis.

The method for producing a crystal nucleating agent for polyolefin resins of the present invention preferably includes, before the step (i), mixing an unpulverized crystal nucleating agent (A), an unpulverized fluidity improver, and optionally an additive for polyolefin resins other than the crystal nucleating agent and the fluidity improver.

The method for producing a crystal nucleating agent for polyolefin resins of the present invention preferably includes, between the step (i) and the step (ii), the following steps (i-1) and (i-2): (i-1) pulverizing a fluidity improver to an average particle size of 5 μm or smaller and a particle size uniformity of 3 or lower; and (i-2) mixing the pulverized product obtained in the step (i), the pulverized fluidity improver obtained in the step (i-1), and optionally an additive for polyolefin resins other than the crystal nucleating agent and the fluidity improver.

The present invention also relates to a polyolefin resin composition including: a polyolefin resin; and the crystal nucleating agent for polyolefin resins or a crystal nucleating agent for polyolefin resins produced by the method for producing a crystal nucleating agent for polyolefin resins.

The present invention also relates to a polyolefin resin molded article produced using the polyolefin resin composition.

The present invention also relates to a method for improving the fluidity of a crystal nucleating agent for polyolefin resins, including pulverizing all or part of a crystal nucleating agent (A) with a jet pulverizer to provide a pulverized product having characteristics satisfying both the following requirements (a) and (b): (a) the pulverized product has an average particle size of 0.5 to 4.0 μm and a particle size uniformity of 3 to 10 as determined by laser diffraction particle size distribution measurement; and (b) the pulverized product has a 50% value of an aspect ratio of 0.40 to 0.70 and a lower value of the aspect ratio of 0.2 to 0.4 as determined by particle image analysis.

In the method for improving the fluidity of a crystal nucleating agent for polyolefin resins of the present invention, the crystal nucleating agent (A) is preferably a mixture of a crystal nucleating agent (B) having an average particle size of 0.5 to 2.0 μm as determined by laser diffraction particle size distribution measurement and a crystal nucleating agent (C) having an average particle size of 4.0 to 15.0 μm as determined by laser diffraction particle size distribution measurement.

The method for improving the fluidity of a crystal nucleating agent for polyolefin resins of the present invention preferably includes (c) adjusting an aerated bulk density of the crystal nucleating agent (A) to 0.20 g/cm³ or higher and a packed bulk density of the crystal nucleating agent (A) to 0.30 g/cm³ or higher.

The crystal nucleating agent (A) preferably has a 50% value of the aspect ratio of 0.40 to 0.70 and a lower value of the aspect ratio of 0.2 to 0.4 as determined by particle image analysis.

The method for improving the fluidity of a crystal nucleating agent for polyolefin resins of the present invention preferably includes: pulverization with a jet pulverizer; and subjecting the obtained pulverized product to volume-reducing treatment.

The present invention also relates to a method for improving the fluidity of a crystal nucleating agent for polyolefin resins, including: adjusting an average particle size of a crystal nucleating agent for polyolefin resins that contains a crystal nucleating agent (A) and a fluidity improver to 0.5 to 4 μm and a particle size uniformity of the crystal nucleating agent for polyolefin resins to 3 to 10; and adjusting an aerated bulk density of the crystal nucleating agent for polyolefin resins to 0.20 g/cm³ or higher and a packed bulk density of the crystal nucleating agent for polyolefin resins to 0.30 g/cm³ or higher.

The method for improving the fluidity of a crystal nucleating agent for polyolefin resins of the present invention preferably includes pulverizing the crystal nucleating agent for polyolefin resins containing a crystal nucleating agent (A) and a fluidity improver with a jet pulverizer; and subjecting the pulverized product to volume-reducing treatment.

Advantageous Effects of Invention

The crystal nucleating agent for polyolefin resins of the present invention has very excellent fluidity to remarkably contribute to the improvement of the productivity or the like. The crystal nucleating agent for polyolefin resins also has very excellent dispersibility or solubility in polyolefin resins and is very useful from the standpoint of the performance of molded articles. The crystal nucleating agent for polyolefin resins of the present invention is excellent in productivity and widely usable in various applications, and can provide a molded article with excellent properties, being very useful in many applications. In particular, in medical applications which restrict the use of additives, the present invention is greatly expected to be utilized as a technique capable of improving the fluidity and the dispersibility at the same time substantially without additives.

DESCRIPTION OF EMBODIMENTS

Crystal Nucleating Agent for Polyolefin Resins

The crystal nucleating agent for polyolefin resins of the present invention at least contains a crystal nucleating agent (A). The crystal nucleating agent (A) may be any crystal nucleating agent that can be used as a crystal nucleating agent for polyolefin resins. The crystal nucleating agent (A) may suitably be a crystal nucleating agent having the size, shape, and composition described later and produced by the method described later.

The crystal nucleating agent for polyolefin resins of the present invention has an average particle size of 0.5 to 4.0 μm and a particle size uniformity of 3 to 10 as determined by laser diffraction particle size distribution measurement. The average particle size as determined by laser diffraction particle size distribution measurement is preferably 0.5 μm to 3.0 μm, more preferably 0.5 μm to 2.5 μm, still more preferably 1.0 μm to 2.5 μm. The particle size uniformity is preferably 3 to 7, more preferably 4 to 7.

It is known that typically a crystal nucleating agent for polyolefin resins with a smaller average particle size and a particle size uniformity closer to 1 has better dispersibility or solubility in polyolefin resins. However, it is also well known that in a crystal nucleating agent for polyolefin resins containing only the crystal nucleating agent (A), a decrease in particle size tends to decrease the fluidity. Meanwhile, it is known that a crystal nucleating agent for polyolefin resins with a larger average particle size has better fluidity. However, it is also well known that in a crystal nucleating agent for polyolefin resins containing only the crystal nucleating agent (A), an increase in particle size tends to decrease the dispersibility or solubility.

In the crystal nucleating agent for polyolefin resins of the present invention, the average particle size is adjusted not to exceed or fall below the range that provides the fluidity, dispersibility, and solubility in a balanced manner. The range of the particle size uniformity is also adjusted. The crystal nucleating agent for polyolefin resins thus can have excellent dispersibility and solubility while having further improved fluidity.

In the Description and the Claims, the "average particle size" means a volume-based cumulative 50% particle size (d50) in a particle size distribution determined by laser diffraction particle size distribution measurement. In the Description, the "average particle size" may also be referred to as an "average of the particle size". In the Description and the Claims, the "particle size uniformity" means the ratio (d60/d10) of a volume-based cumulative 60% particle size (d60) to a volume-based cumulative 10% particle size (d10) in the above particle size distribution. A 60/d10 value closer to 1 indicates a narrower particle size distribution.

The laser diffraction particle size distribution measurement can be performed using a common device by a common method under common conditions. For example, using a laser diffraction particle size distribution analyzer ("Mastersizer 3000" available from Malvern Instruments), a sample is dispersed in an aqueous solution containing a surfactant as a dispersant by sufficient stirring in a wet measurement cell, the resulting mixture is further stirred and circulated in the analyzer and uniformly dispersed in the analyzer under irradiation with ultrasonic wave, and the particle size distribution of the sample can be measured under irradiation with ultrasonic wave.

In the crystal nucleating agent for polyolefin resins of the present invention, the crystal nucleating agent (A) preferably has a 50% value of the aspect ratio of 0.40 to 0.70 and a lower value of the aspect ratio of 0.2 to 0.4 as determined by particle image analysis. The crystal nucleating agent (A) more preferably has a 50% value of the aspect ratio of 0.45 to 0.65 as determined by particle image analysis.

The aspect ratio of the crystal nucleating agent (A) is known to be one of the factors that influence the fluidity. However, the fluidity improvement depends on the type of the target compound and the state of the flow field, and there are no established guidelines on which factors should be investigated. Investigation is thus substantially made based on imagined complex effects of multiple factors including the aspect ratio. In the present invention, the aspect ratios of fine particles prepared under various conditions were measured by particle image analysis. The measurement showed that the fluidity improvement is positively influenced by the crystal nucleating agent (A) containing fewer high-aspect-ratio particles and having a shape that has the median of the aspect ratio within a specific range. The volume reduction described later is facilitated by the use of a crystal nucleating agent (A) containing fewer high-aspect-ratio particles and having a shape that has the median of the aspect ratio in the above preferred range. The use of such a crystal nucleating agent (A) also positively influences improvement of performance of the obtained volume-reduced product such as fluidity.

The measurement result of the lower value of the aspect ratio is used as an index of the proportion of high-aspect-ratio particles. The measurement result of the cumulative 50% value of the aspect ratio is used as an index of the median of the aspect ratio.

In the Description and the Claims, the "50% value" means a cumulative 50% value in an aspect ratio distribution determined by particle image analysis. The 50% value means the median of the aspect ratio as mentioned above. Similarly, in the Description and the Claims, the "lower value" means a cumulative 10% value in an aspect ratio distribution determined by particle image analysis. A greater lower value indicates a lower proportion of high-aspect-ratio particles as mentioned above.

The aspect ratio may be measured by particle image analysis using a common device and a common method under common conditions. Specifically, for example, the following method may be used. A surfactant as a dispersant is added to ion-exchanged water in a measurement container. A measurement sample is then added thereto and uniformly dispersed by dispersing treatment. The measurement sample is then analyzed by a flow particle image analyzer ("FPIA-3000" available from Malvern Instruments) and the aspect ratio distribution of the sample can be determined by the resulting data.

The crystal nucleating agent (A) is preferably a mixture of a crystal nucleating agent (B) having an average particle size of 0.5 to 2.0 μm as determined by laser diffraction particle size distribution measurement and a crystal nucleating agent (C) having an average particle size of 4.0 to 15.0 μm as determined by laser diffraction particle size distribution measurement. The crystal nucleating agent (B) more preferably has an average particle size of 0.5 to 1.5 μm.

The characteristics of the crystal nucleating agent for polyolefin resins of the present invention may be adjusted by any method that satisfies the above characteristics including the average particle size, particle size uniformity, and aspect ratio. For example, the adjustment may be made by a method including adjusting the particle shape in the production process, for example in a reaction step or a post treatment step, or a method including adjusting the particle shape after production of the crystal nucleating agent for polyolefin resins. The adjustment after production of the crystal nucleating agent may be made by any method such as re-crystallization or wet or dry pulverization. The pulverization may be performed by any method such as a dry jet pulverization method or a wet pulverization method. From the viewpoint of ease of adjustment, preferred among the methods is a method including adjusting the particle shape after production of the crystal nucleating agent for polyolefin resins.

For example, a preferred method for adjusting characteristics after production of the crystal nucleating agent for polyolefin resins is a method including pulverization using a jet mill-type jet pulverizer from the standpoint of ease of adjustment of characteristics such as the average particle size. The pulverization may be performed under conditions controlled to achieve the target characteristics. In cases where the crystal nucleating agent (A) is a mixture of the crystal nucleating agent (B) and the crystal nucleating agent (C), the crystal nucleating agent (B) is preferably a pulverized product prepared with a jet pulverizer. The characteristics may be adjusted by a method including mixing the crystal nucleating agent (B) pulverized in advance and the unpulverized crystal nucleating agent (C) at a ratio adjusted to achieve the target characteristics.

In the method including mixing the pulverized crystal nucleating agent (B) and the unpulverized crystal nucleating agent (C), the ratio between them varies depending on the particle size of each crystal nucleating agent and is not necessary within a fixed range. Usually, the ratio of the pulverized product (e.g., the crystal nucleating agent (B)) to the unpulverized product (e.g., the crystal nucleating agent (C)) is preferably adjusted within a range of about 1/1 to 3/1 from the standpoint of productivity and performance. In some applications, a single type of nucleating agent may not provide a desired performance. In such a case, the method is advantageous because the crystal nucleating agent of the present invention can be obtained by pulverizing only one of the crystal nucleating agents.

The crystal nucleating agent for polyolefin resins of the present invention preferably has an aerated bulk density of 0.20 $g/cm^3$ or higher and a packed bulk density of 0.30 $g/cm^3$ or higher. The aerated bulk density is more preferably 0.24 $g/cm^3$ or higher. The packed bulk density is more preferably 0.34 $g/cm^3$ or higher. Typically, a higher bulk density tends to lead to a better fluidity. Also in the crystal nucleating agent for polyolefin resins of the present invention, increasing the bulk density without causing caking or changing the shape of the fine particles tends to increase the fluidity. With the above bulk density or higher, the crystal nucleating agent for polyolefin resins of the present invention can exhibit excellent fluidity regardless of the type of the crystal nucleating agent. The upper limit of the bulk density is preferably adjusted in a range that minimizes a decrease in the dispersibility or solubility in resin due to caking. The caking may vary depending on the type of the crystal nucleating agent (A) or the method for the volume reduction described later. For example, when the crystal nucleating agent (A) is a diacetal crystal nucleating agent and the volume is reduced by a compression method with a screw or the like, the upper limit of the bulk density at or above which caking may occur to decrease the dispersibility is as follows: an aerated bulk density of about 0.5 g/cm³ and a packed bulk density of about 1.0 g/cm³. Here, caking may not occur at bulk densities equal to or higher than these values, depending on the type of the crystal nucleating agent (A) and the method for volume reduction.

The bulk density refers to the density of a material filled in a container, calculated using the interior capacity of the container as the volume of the material. The bulk density obtained by the measurement performed on a material slowly (without pressurization) filled in the container to a roughly packed state is the aerated bulk density, and the bulk density obtained by the measurement performed on the material further tapped under a certain condition to a densely packed state is the packed bulk density.

The bulk density is a value easily obtainable by measuring the capacity of the container and the weight of the contents filled therein as described above, and it can be measured, for example, by the following method.

A funnel is set on the opening of a measuring cylinder vertically, and a predetermined amount of a sample is slowly (without pressurization) filled into the measuring cylinder thorough the funnel, and the weight of the sample in the measuring cylinder is measured using a scale. The aerated bulk density is obtained by the following equation (1) using the obtained weight. Subsequently, the measuring cylinder is dropped onto a rubber sheet or the like from a certain height (tapping) for a predetermined times, and the volume of the sample in the measuring cylinder is read. The packed bulk density is obtained by the following equation (2).

Equation (1):

Aerated bulk density (g/cm³)=Weight of sample (g)/ Capacity of measuring cylinder (cm³)

Equation (2):

Packed bulk density (g/cm³)=Weight sample (g)/ Volume of sample after tapping (cm³)

For example, the bulk density may be suitably obtained by, after pulverization using the jet pulverizer, volume reduction by compression or deaeration with a common device to an aerated bulk density and a packed bulk density within the above ranges. In other words, the crystal nucleating agent for polyolefin resins of the present invention is preferably a volume-reduced product of a pulverized product prepared with a jet pulverizer.

The volume reduction does not mean a usual method for solidification by dissolution or melting, but means a method for reducing the volume by removing air between the particles basically without substantially changing the shape of the fine particles obtained by pulverization. Examples of such a method include a method for reducing the volume by pushing air out by pressurization with a roller or a screw, a method for reducing the volume by forcefully suctioning air out with a vacuum pump, and a method for reducing the volume by mixing using a vessel rotating type mixer such as a tumbler mixer, a V-type mixer, or a W-type mixer, a drum mixer. Here, any method may be used to reduce the volume as long as the method does not substantially change the shape of the fine particles and provides a bulk density within the above range.

In the crystal nucleating agent for polyolefin resins of the present invention, the angle of repose is known to be an effective index of the fluidity, a property the present invention aims to improve. The angle of repose is preferably 48° or smaller, more preferably 45° or smaller for the crystal nucleating agent for polyolefin resins of the present invention to fulfill the aim of the present invention, that is, to solve problems such as difficulty in adding due to bridging during, for example, addition of the crystal nucleating agent for polyolefin resin through a hopper to a polyolefin resin in a conventional method.

In the crystal nucleating agent for polyolefin resins of the present invention, the crystal nucleating agent (A) may be of any type as long as the effect of the present invention is exerted. Examples thereof include diacetal compounds, carboxylate compounds, phosphate compounds, amide compounds, and rosin compounds. In particular, when the crystal nucleating agent (A) is a diacetal compound, the effect of the present invention is most significant. In cases where the crystal nucleating agent (A) is a mixture of the crystal nucleating agent (B) and the crystal nucleating agent (C), at least one of the crystal nucleating agent (B) or the crystal nucleating agent (C) is preferably a diacetal compound.

The diacetal compound is not particularly limited, and a favorable example thereof is a diacetal compound represented by the following formula (1):

[Chem. 2]

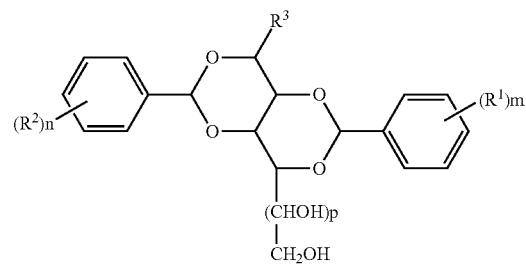

(1)

wherein $R^1$ and $R^2$ are the same as or different from each other and each represent a hydrogen atom, a C1-C4 linear or branched alkyl group, a C1-C4 linear or branched alkoxy group, a C1-C4 linear or branched alkoxy carbonyl group, or a halogen atom; $R^3$ represents a hydrogen atom, a C1-C4 linear or branched alkyl group, a C2-C4 linear or branched alkenyl group, or a C1-C4 linear or branched hydroxy alkyl group; m and n each represent an integer of 1 to 5; p represents 0 or 1; and two $R^1$s optionally bind to each other to form a tetralin ring together with a benzene ring to which they are bonded and two $R^2$s optionally bind to each other to form a tetralin ring together with a benzene ring to which they are bonded.

Among the diacetal compounds, more preferred are compounds represented by the formula (1) wherein $R^1$ and $R^2$ are the same as or different from each other and each represent a methyl group or an ethyl group, $R^3$ represents a hydrogen atom, m and n each represent an integer of 1 or 2, and p represents 1.

In addition, examples of more preferred compounds include the following compounds: compounds represented by the formula (1) wherein $R^1$ and $R^2$ each represent a propyl group or a propoxy group, $R^3$ represents a propyl group or a propenyl group, m and n each represents 1, and p represents 1.

As specific embodiments of the diacetal compounds, the following compounds can be exemplified: 1,3:2,4-di-O-benzylidene-D-sorbitol, 1,3:2,4-bis-O-(methylbenzylidene)-D-sorbitol, 1,3:2,4-bis-O-(o-methylbenzylidene)-D-sorbitol, 1,3:2,4-bis-O-(m-methylbenzylidene)-D-sorbitol, 1,3:2,4-bis-O-(p-methylbenzylidene)-D-sorbitol, 1,3:2,4-bis-O-(ethylbenzylidene)-D-sorbitol, 1,3:2,4-bis-O-(o-ethylbenzylidene)-D-sorbitol, 1,3:2,4-bis-O-(m-ethylbenzylidene)-D-sorbitol, 1,3:2,4-bis-O-(p-ethylbenzylidene)-D-sorbitol, 1,3:2,4-bis-O-(o-isopropylbenzylidene)-D-sorbitol, 1,3:2,4-bis-O-(m-isopropylbenzylidene)-D-sorbitol, 1,3:2,4-bis-O-(p-isopropylbenzylidene)-D-sorbitol, 1,3:2,4-bis-O-(o-n-propylbenzylidene)-D-sorbitol, 1,3:2,4-bis-O-(m-n-propylbenzylidene)-D-sorbitol, 1,3:2,4-bis-O-(p-n-propylbenzylidene)-D-sorbitol, 1,3:2,4-bis-O-(o-n-butylbenzylidene)-D-sorbitol, 1,3:2,4-bis-O-(m-n-butylbenzylidene)-D-sorbitol, 1,3:2,4-bis-O-(p-n-butylbenzylidene)-D-sorbitol, 1,3:2,4-bis-O-(o-tert-butylbenzylidene)-D-sorbitol, 1,3:2,4-(m-tert-butylbenzylidene)-D-sorbitol, 1,3:2,4-bis-O-(p-tert-butylbenzylidene)-D-sorbitol, 1,3:2,4-bis-O-(dimethylbenzylidene)-D-sorbitol, 1,3:2,4-bis-O-(2',3'-dimethylbenzylidene)-D-sorbitol, 1,3:2,4-bis-O-(2',4'-dimethylbenzylidene)-D-sorbitol, 1,3:2,4-bis-O-(2',5'-dimethylbenzylidene)-D-sorbitol, 1,3:2,4-bis-O-(2',6'-dimethylbenzylidene)-D-sorbitol, 1,3:2,4-bis-O-(3',4'-dimethylbenzylidene)-D-sorbitol, 1,3:2,4-bis-O-(3',5'-dimethylbenzylidene)-D-sorbitol, 1,3:2,4-bis-O-(2',3'-diethylbenzylidene)-D-sorbitol, 1,3:2,4-bis-O-(2',4'-diethylbenzylidene)-D-sorbitol, 1,3:2,4-bis-O-(2',5'-diethylbenzylidene)-D-sorbitol, 1,3:2,4-bis-O-(2',6'-diethylbenzylidene)-D-sorbitol, 1,3:2,4-bis-O-(3',4'-diethylbenzylidene)-D-sorbitol, 1,3:2,4-bis-O-(3',5'-diethylbenzylidene)-D-sorbitol, 1,3:2,4-bis-O-(2',4',5'-trimethylbenzylidene)-D-sorbitol, 1,3:2,4-bis-O-(3',4',5'-trimethylbenzylidene)-D-sorbitol, 1,3:2,4-bis-O-(2',4',5'-triethylbenzylidene)-D-sorbitol, 1,3:2,4-bis-O-(3',4',5''-triethylbenzylidene)-D-sorbitol, 1,3:2,4-bis-O-(o-methoxybenzylidene)-D-sorbitol, 1,3:2,4-bis-O-(m-methoxybenzylidene)-D-sorbitol, 1,3:2,4-bis-O-(p-methoxybenzylidene)-D-sorbitol, 1,3:2,4-bis-O-(o-ethoxybenzylidene)-D-sorbitol, 1,3:2,4-bis-O-(m-ethoxybenzylidene)-D-sorbitol, 1,3:2,4-bis-O-(p-ethoxybenzylidene)-D-sorbitol, 1,3:2,4-bis-O-(o-isopropoxybenzylidene)-D-sorbitol, 1,3:2,4-bis-O-(m-isopropoxybenzylidene)-D-sorbitol, 1,3:2,4-bis-O-(p-isopropoxybenzylidene)-D-sorbitol, 1,3:2,4-bis-O-(o-n-propoxybenzylidene)-D-sorbitol, 1,3:2,4-bis-O-(m-n-propoxybenzylidene)-D-sorbitol, 1,3:2,4-bis-O-(p-n-propoxybenzylidene)-D-sorbitol, 1,3:2,4-bis-O-(o-methoxycarbonylbenzylidene)-D-sorbitol, 1,3:2,4-bis-O-(m-methoxycarbonylbenzylidene)-D-sorbitol, 1,3:2,4-bis-O-(p-methoxycarbonylbenzylidene)-D-sorbitol, 1,3:2,4-bis-O-(o-ethoxycarbonylbenzylidene)-D-sorbitol, 1,3:2,4-bis-O-(m-ethoxycarbonylbenzylidene)-D-sorbitol, 1,3:2,4-bis-O-(p-ethoxycarbonylbenzylidene)-D-sorbitol, 1,3:2,4-bis-O-(o-isopropoxycarbonylbenzylidene)-D-sorbitol, 1,3:2,4-bis-O-(m-isopropoxycarbonylbenzylidene)-D-sorbitol, 1,3:2,4-bis-O-(p-isopropoxycarbonylbenzylidene)-D-sorbitol, 1,3:2,4-bis-O-(o-n-propoxycarbonylbenzylidene)-D-sorbitol, 1,3:2,4-bis-O-(m-n-propoxycarbonylbenzylidene)-D-sorbitol, 1,3:2,4-bis-O-(p-n-propoxycarbonylbenzylidene)-D-sorbitol, 1,3:2,4-bis-O-(o-fluorobenzylidene)-D-sorbitol, 1,3:2,4-bis-O-(m-fluorobenzylidene)-D-sorbitol, 1,3:2,4-bis-O-(p-fluorobenzylidene)-D-sorbitol, 1,3:2,4-bis-O-(o-chlorobenzylidene)-D-sorbitol, 1,3:2,4-bis-O-(m-chlorobenzylidene)-D-sorbitol, 1,3:2,4-bis-O-(p-chlorobenzylidene)-D-sorbitol, 1,3:2,4-bis-O-(o-bromobenzylidene)-D-sorbitol, 1,3:2,4-bis-O-(m-bromobenzylidene)-D-sorbitol, 1,3:2,4-bis-O-(p-bromobenzylidene)-D-sorbitol, 1,3-O-benzylidene-2,4-O-(p-methylbenzylidene)-D-sorbitol, 1,3-O-(p-methylbenzylidene)-2,4-O-benzylidene-D-sorbitol, 1,3-O-benzylidene-2,4-O-(p-ethylbenzylidene)-D-sorbitol, 1,3-O-(p-ethylbenzylidene)-2,4-O-benzylidene-D-sorbitol, 1,3-O-benzylidene-2,4-O-(p-chlorobenzylidene)-D-sorbitol, 1,3-O-(p-chlorobenzylidene)-2,4-O-benzylidene-D-sorbitol, 1,3-O-benzylidene-2,4-O-(2', 4'-dimethylbenzylidene)-D-sorbitol, 1,3-O-(2',4'-dimethylbenzylidene)-2,4-O-benzylidene-D-sorbitol, 1,3-O-benzylidene-2,4-O-(3',4'-dimethylbenzylidene)-D-sorbitol, 1,3-O-(3',4'-dimethylbenzylidene)-2,4-O-benzylidene-D-sorbitol, 1,3-O-(p-methylbenzylidene)-2,4-O-(p-ethylbenzylidene)-D-sorbitol, 1,3-O-(p-ethylbenzylidene)-2,4-O-(p-methylbenzylidene)-D-sorbitol, 1,3-O-(p-methylbenzylidene) -2,4-O- (3',4'-dimethylbenzylidene)-D-sorbitol, 1,3-O-(3',4'-dimethylbenzylidene)-2,4-O-p-methylbenzylidene-D-sorbitol, 1,3-O-(p-ethylbenzylidene)-2,4-O-(3',4'-dimethylbenzylidene)-D-sorbitol, 1,3-O-(3',4'-dimethylbenzylidene)-2,4-O-p-ethylbenzylidene-D-sorbitol, 1,3-O-(p-methylbenzylidene)-2,4-O-(p-chlorobenzylidene)-D-sorbitol, 1,3-O-(p-chlorobenzylidene)-2,4-O-(p-methylbenzylidene)-D-sorbitol, 1,3:2,4-bis-O-benzylidene-1-methylsorbitol, 1,3:2,4-bis-O-(p-methylbenzylidene)-1-methylsorbitol, 1,3:2,4-bis-O-(p-ethylbenzylidene)-1-methylsorbitol, 1,3:2,4-bis-O-(p-n-propylbenzylidene)-1-methylsorbitol, 1,3:2,4-bis-O-(2',3'-dimethylbenzylidene)-1-methylsorbitol, 1,3:2,4-bis-O-(2',4'-dimethylbenzylidene)-1-methylsorbitol, 1,3:2,4-bis-O-(2',5'-dimethylbenzylidene)-1-methylsorbitol, 1,3:2,4-bis-O-(2',6'-dimethylbenzylidene)-1-methylsorbitol, 1,3:2,4-bis-O-(3',4'-dimethylbenzylidene)-1-methylsorbitol, 1,3:2,4-bis-O-(3',5'-dimethylbenzylidene)-1-methylsorbitol, 1,3:2,4-bis-O-(2',3'-diethylbenzylidene)-1-methylsorbitol, 1,3:2,4-bis-O-(2',4'-diethylbenzylidene)-1-methylsorbitol, 1,3:2,4-bis-O-(2',5'-diethylbenzylidene)-1-methylsorbitol, 1,3:2,4-bis-O-(2',6'-diethylbenzylidene)-1-methylsorbitol, 1,3:2,4-bis-O-(3',4'-diethylbenzylidene)-1-methylsorbitol, 1,3:2,4-bis-O-(3',5'-diethylbenzylidene)-1-methylsorbitol, 1,3:2,4-bis-O-(3'-methyl-4'-methoxybenzylidene)-1-methylsorbitol, 1,3:2,4-bis-O-(3',4'-dichlorobenzylidene)-1-methylsorbitol, 1,3:2,4-bis-O-(p-methoxycarbonylbenzylidene)-1-methylsorbitol, 1,3:2,4-bis-O-(3'-methyl-4'-fluorobenzylidene)-1-methylsorbitol, 1,3:2,4-bis-O-(3'-bromo-4'-ethylbenzylidene)-1-methylsorbitol, 1,3:2,4-bis-O-benzylidene-1-ethylsorbitol, 1,3:2,4-bis-O-(p-methylbenzylidene)-1-ethylsorbitol, 1,3:2,4-bis-O-(p-ethylbenzylidene)-1-ethylsorbitol, 1,3:2,4-bis-O-(p-n-propylbenzylidene)-1-ethylsorbitol, 1,3:2,4-bis-O-(2',3'-dimethylbenzylidene)-1-ethylsorbitol, 1,3:2,4-bis-O-(2',4'-dimethylbenzylidene)-1-ethylsorbitol, 1,3:2,4-bis-O-(2',5'-dimethylbenzylidene)-1-ethylsorbitol, 1,3:2,4-bis-O-(2',6'-dimethylbenzylidene)-1-ethylsorbitol, 1,3:2,4-bis-O-(3',4'-dimethylbenzylidene)-1-ethylsorbitol, 1,3:2,4-bis-O-(3',5'- dimethylbenzylidene)-1-ethylsorbitol, 1,3:2,4-bis-O-(2',3'-diethylbenzylidene)-1-ethylsorbitol, 1,3:2,4-bis-O-(2',4'-diethylbenzylidene)-1-ethylsorbitol, 1,3:2,4-bis-O-(2',5'-diethylbenzylidene)-1-ethylsorbitol, 1,3:2,4-bis-O-(2',6'-diethylbenzylidene)-1-ethylsorbitol, 1,3:2,4-bis-O-(3',4'-diethylbenzylidene)-1-ethylsorbitol, 1,3:2,4-bis-O-(3',5'-diethylbenzylidene)-1-ethylsorbitol, 1,3:2,4-bis-O-(3'-methyl-4'-methoxybenzylidene)-1-ethylsorbitol, 1,3:2,4-bis-O-(3',4'-dichlorobenzylidene)-1-ethylsorbitol, 1,3:2,4-bis-O-(p-methoxycarbonylbenzylidene)-1-ethylsorbitol, 1,3:2,4-bis-O-(3'-methyl-4'-fluorobenzylidene)-1-ethylsorbitol, 1,3:2,4-bis-O-(3'-bromo-4'-ethylbenzylidene)-1-ethylsorbitol, 1,3:2,4-bis-O-benzylidene-1-n-propylsorbitol, 1,3:2,4-bis-O-(p-methylbenzylidene)-1-n-propylsorbitol, 1,3:2,4-bis-O-(p-ethylbenzylidene)-1-n-propylsorbitol, 1,3:2,4-bis-O-(p-n-propylbenzylidene)-1-n-propylsorbitol, 1,3:2,4-bis-O-(2',3'-dimethylbenzylidene)-1-n-propylsorbitol, 1,3:2,4-bis-O-(2',4'-dimethylbenzylidene)-1-n-propylsorbitol, 1,3:2,4-bis-O-(2',5'-dimethylbenzylidene)-1-n-propylsorbitol, 1,3:2,4-bis-O-(2',6'-dimethylbenzyildene)-1-n-propylsorbitol, 1,3:2,4-bis-O-(3',4'-dimethyibenzylidene)-1-n-propylsorbitol, 1,3:2,4-bis-O-(3',5'-dimethylbenzylidene)-1-n-propylsorbitol, 1,3:2,4-bis-O-(2',3'-diethylbenzylidene)-1-n-propylsorbitol, 1,3:2,4-bis-O-(2',4'-diethylbenzylidene)-1-n-propylsorbitol, 1,3:2,4-bis-O-(2',5'-diethylbenzylidene)-1-n-propylsorbitol, 1,3:2,4-bis-O-(2',6'-diethylbenzylidene)-1-n-propylsorbitol, 1,3:2,4-bis-O-(3',4'-diethylbenzylidene)-1-n-propylsorbitol, 1,3:2,4-bis-O-(3',5'-diethylbenzylidene)-1-n-propylsorbitol, 1,3:2,4-bis-O-(3'-methyl-4'-methoxybenzylidene)-1-n-propylsorbitol, 1,3:2,4-bis-O-(3',4'-dichlorobenzyndene)-1-n-propylsorbitol, 1,3:2,4-bis-O-(p-methoxycarbonylbenzylidene)-1-n-propylsorbitol, 1,3:2,4-bis-O-(p-ethoxycarbonylbenzylidene)-1-n-propylsorbitol, 1,3:2,4-bis-O-(p-propoxycarbonylbenzylidene)-1-n-propylsorbitol, 1,3-O-(p-n-propylbenzylidene)-2,4-O-(p-propoxybenzylidene)-1-n-propylsorbitol, 1,3-O-(p-propoxybenzylidene)-2,4-O-(p-n-propylbenzylidene)-1-n-propylsorbitol, 1,3:2,4-bis-O-(3'-methyl-4'-fluorobenzylidene)-1-n-propylsorbitol, 1,3:2,4-bis-O-(3'-bromo-4'-ethylbenzylidene)-1-n-propylsorbitol, 1,3:2,4-bis-O-(p-n-propylbenzylidene)-1-propenylsorbitol, 1,3:2,4-bis-O-(p-ethoxycarbonylbenzylidene)-1-propenylsorbitol, 1,3:2,4-bis-O-(p-propoxycarbonylbenzylidene)-1-propenylsorbitol, 1,3-O-(p-n-propylbenzylidene)-2,4-O-(p-propoxybenzylidene)-1-propenylsorbitol, 1,3-O-(p-propoxybenzylidene)-2,4-O-(p-n-propylbenzylidene)-1-propenylsorbitol, 1,3:2,4-bis-O-benzylidene-1-allylsorbitol, 1,3:2,4-bis-O-(p-methylbenzylidene)-1-allylsorbitol, 1,3:2,4-bis-O-(p-ethylbenzylidene)-1-allylsorbitol, 1,3:2,4-bis-O-(p-n-propylbenzylidene)-1-allylsorbitol, 1,3:2,4-bis-O-(2',3'-dimethylbenzylidene)-1-allylsorbitol, 1,3:2,4-bis-O-(2',4'-dimethylbenzylidene)-1-allylsorbitol, 1,3:2,4-bis-O-(2',5'-dimethylbenzylidene)-1-allylsorbitol, 1,3:2,4-bis-O-(2',6'-dimethylbenzylidene)-1-allylsorbitol, 1,3:2,4-bis-O-(3',4'-dimethylbenzylidene)-1-allylsorbitol, 1,3:2,4-bis-O-(3',5'-dimethylbenzylidene)-1-allylsorbitol, 1,3:2,4-bis-O-(2',3'-diethylbenzylidene)-1-allylsorbitol, 1,3:2,4-bis-O-(2',4'-diethylbenzylidene)-1-allylsorbitol, 1,3:2,4-bis-O-(2',5'-diethylbenzylidene)-1-allylsorbitol, 1,3:2,4-bis-O-(2',6'-diethylbenzylidene)-1-allylsorbitol, 1,3:2,4-bis-O-(3',4'-diethylbenzylidene)-1-allylsorbitol, 1,3:2,4-bis-O-(p-ethoxycarbonylbenzylidene)-1-allylsorbitol, 1,3:2,4-bis-O-(p-propoxycarbonylbenzylidene)-1-allylsorbitol, 1,3-O-(p-n-propylbenzylidene)-2,4-O-(p-propoxybenzylidene)-1-allylsorbitol, 1,3-O-(p-propoxybenzylidene)-2,4-O-(p-n-propylbenzylidene)-1-allylsorbitol, 1,3:2,4-bis-O-(3',5'-diethylbenzylidene)-1-n-propylsorbitol, 1,3:2,4-bis-O-(3'-methyl-4'-methoxybenzylidene)-1-allylsorbitol, 1,3:2,4-bis-O-(3',4'-dichlorobenzylidene)-1-allylsorbitol, 1,3:2,4-bis-O-(p-methoxycarbonylbenzylidene)-1-allylsorbitol, 1,3:2,4-bis-O-(3'-methyl-4'-fluorobenzylidene)-1-allylsorbitol, and 1,3:2,4-bis-O-(3'-bromo-4'-ethylbenzylidene)-1-allylsorbitol.

As particularly preferred embodiments, 1,3:2,4-bis-O-(p-methylbenzylidene) -D-sorbitol, 1,3:2,4-bis-O-(p-ethylbenzylidene)-D-sorbitol, 1,3:2,4-bis-O-(3',4'-dimethylbenzylidene)-D-sorbitol, and 1,3:2,4-bis-O-(p-n-propylbenzylidene)-1-propylsorbitol can be exemplified.

These diacetal compounds of the above specific embodiments may be used alone. In terms of other properties such as low-temperature processability, two or more types of diacetal compounds may be used in combination or in admixture.

In cases where diacetal compounds are used in combination or in admixture, examples of the combination thereof include a combination of 1,3:2,4-di-O-benzylidene-D-sorbitol and 1,3:2,4-bis-O-(p-methylbenzylidene)-D-sorbitol, a combination of 1,3:2,4-bis-O-(p-ethylbenzylidene)-D-sorbitol and 1,3:2,4-bis-O-(3',4'-dimethylbenzylidene)-D-sorbitol, a combination of 1,3:2,4-di-O-benzylidene-D-sorbitol and 1,3:2,4-bis-O-(3',4'-dimethylbenzylidene)-D-sorbitol, a combination of 1,3:2,4-bis-O-(p-methylbenzylidene)-D-sorbitol and 1,3:2,4-bis-O-(3',4'-dimethylbenzylidene)-D-sorbitol, and a combination of 3:2,4-bis-O-(p-chlorobenzylidene)-D-sorbitol and 1,3:2,4-bis-O-(3',4'-dimethylbenzylidene)-D-sorbitol. Only one of the diacetal compounds in each combination may be pulverized.

The diacetal compounds can be easily produced by any of the production methods disclosed in, for example, JP S48-43748 B, JP S53-5165 A, JP S57-185287 A, JP H02-231488 A, and the like. Also, those presently commercially available as crystal nucleating agents for polyolefins, such as Millad 3988 and. Millad NX8000 available from Milliken (US) and GEL ALL D, GEL ALL MD, and GEL ALL DXR available from New Japan Chemical Co., Ltd., may be used as they are as a crystal nucleating agent having a common particle size (e.g., the crystal nucleating agent (C)) or as a raw material crystal nucleating agent for a pulverized crystal nucleating agent (e.g., a crystal nucleating agent for polyolefin resins with improved fluidity or the crystal nucleating agent (B)).

Examples of the crystal nucleating agent according to the present invention other than the diacetal compounds include: carboxylate compounds such as sodium benzoate, aluminum p-tert-butylbenzoate, metal cyclohexane dicarboxylates represented by the following formula (2), metal norbornane dicarboxylates represented by the following formula (3); ester phosphate compounds represented by the following formula (4); amide compounds represented by the following formula (5); and rosin compounds such as rosin acids represented by the following formula (6) or its metal salt compounds (e.g., alkali metal salts such as lithium, sodium, potassium, and magnesium salts).

[Chem. 3]

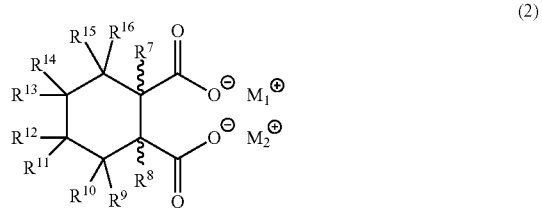

(2)

In the formula, $M_1$ and $M_2$ both represent a lithium ion or the two metal ions of $M_1$ and $M_2$ together form a divalent metal cation as a single metal ion that is calcium, strontium, zinc, magnesium, or monobasic aluminum, $R^7$, $R^8$, $R^9$, $R^{10}$, $R^{11}$, $R^{12}$, $R^{13}$, $R^{14}$, $R^{15}$, and $R^{16}$ are the same as or different from one another and each represent a hydrogen atom, a C1-C9 alkyl group (any of two vicinal (bonded to adjacent carbons) or geminal (bonded to the same carbon) alkyl groups may together form a hydrocarbon ring containing at most 6 carbon atoms), a hydroxyl group, a C1-C9 alkoxy group, a C1-C9 alkyleneoxy group, an amino group, a C1-C9 alkyl amino group, a halogen atom (fluorine, chlorine, bromine, or iodine), or a phenyl group.

[Chem. 4]

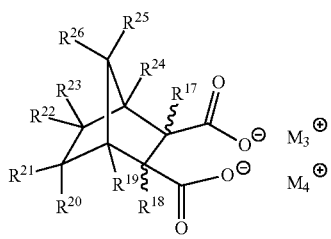

(3)

In the formula, $M_3$ and $M_4$ are the same as or different from each other and each represent a metal cation or an organic cation, or a single metal ion (divalent metal cation, for example, calcium ion), $R^{17}$, $R^{18}$, $R^{19}$, $R^{20}$, $R^{21}$, $R^{22}$, $R^{23}$, $R^{24}$, $R^{25}$, and $R^{26}$ are the same as or different from each other and each represent a hydrogen atom, a C1-C9 alkyl group, a hydroxyl group, a C1-C9 alkoxy group, a C1-C9 alkyleneoxy group, an amino group, a C1-C9 alkyl amino group, a halogen atom, a phenyl group, an alkyl phenyl group, or a geminal or vicinal carbon ring containing at most 9 carbon atoms, and the metal cation is preferably selected from the group consisting of calcium, strontium, barium, magnesium, aluminum, silver, sodium, lithium, rubidium, and potassium and the like.

[Chem. 5]

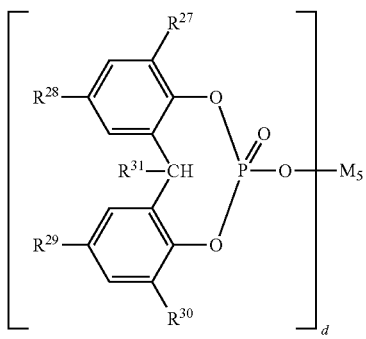

(4)

In the formula, $R^{27}$ to $R^{30}$ are the same as or different from each other and each represent a hydrogen atom or a C1-C9 alkyl group, $R^{31}$ represents a hydrogen atom or a C1-C3 alkyl group, d represents an integer of 1 or 2, and $M_5$ represents an alkali metal when d represents 1 and represents an alkaline earth metal, zinc, or hydroxy aluminum when d represents 2.

[Chem. 6]

(5)

In the formula, f represents an integer of 2 to 6, $R^{32}$ represents a C2-C18 saturated or unsaturated aliphatic polycarboxylic acid residue, a C3-C18 alicyclic polycarboxylic acid residue, or a C6-C18 aromatic polycarboxylic acid residue, 2 to 6 $R^{33}$s are the same as or different from each other and each represent a C5-C30 saturated or unsaturated aliphatic amine residue, a C5-C30 alicyclic amine residue, or a C6-C30 aromatic amine residue.

[Chem. 7]

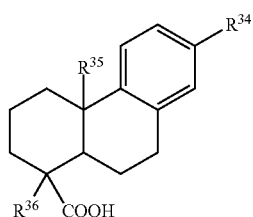

(6)

In the formula, $R^{34}$, $R^{35}$, and $R^{36}$ may be the same as or different from one another and each represent a hydrogen atom, an alkyl group, a cycloalkyl group, or an aryl group.

In cases where the crystal nucleating agent for polyolefin resins of the present invention contains an additive such as the fluidity improver described later, the amount of the crystal nucleating agent (A) in the crystal nucleating agent for polyolefin resins of the present invention is preferably 60 to 99.5% by weight, more preferably 70 to 99% by weight, still more preferably 80 to 95% by weight. In cases where the crystal nucleating agent for polyolefin resins of the present invention contains only the crystal nucleating agent (A), the amount of the crystal nucleating agent (A) in the crystal nucleating agent for polyolefin resins of the present invention is 100% by weight.

The crystal nucleating agent for polyolefin resins of the present invention preferably further contains a fluidity improver.

The fluidity improver may be of any type as long as it exerts the effect of the present invention. In view of its effects and its influence on other characteristics, the fluidity improver is preferably one or two or more selected from the group consisting of a metal salt of a C8-C32 saturated or unsaturated fatty acid, a C14-C32 saturated or unsaturated fatty acid, a C14-C28 saturated or unsaturated aliphatic alcohol, a bisamide of a C12-C32 saturated or unsaturated fatty acid, silica, talc, calcium carbonate, and hydrotalcite, more preferably contains a metal salt of a C8-C30 saturated or unsaturated fatty acid as an organic fluidity improver and/or silica as an inorganic fluidity improver, still more preferably contains a metal salt of a C8-C30 saturated or unsaturated fatty acid as an organic fluidity improver.

The fatty acid constituting the metal salt of a C8-C30 saturated or unsaturated fatty acid is preferably a C12-C22 saturated or unsaturated fatty acid, more preferably a C16-C22 saturated fatty acid. The metal salt is preferably at least one selected from the group consisting of a lithium salt, a zinc salt, a magnesium salt, and a calcium salt, more preferably a calcium salt.

Specific examples of the metal salt of a C8-C30 saturated or unsaturated fatty acid include zinc laurate, calcium laurate, lithium myristate, zinc myristate, magnesium myristate, calcium myristate, lithium stearate, zinc stearate, magnesium stearate, calcium stearate, calcium oleate, lithium behenate, zinc behenate, magnesium behenate, calcium behenate, zinc erucate, zinc montanate, magnesium montanate, and calcium montanate. More preferred among them are calcium stearate and calcium behenate. Still more preferred is calcium behenate.

The silica may be natural or synthetic and may be hydrophilic or hydrophobic as long as the effect of the present invention is exerted. Specific examples thereof include fumed silica, precipitated silica, and silica gel.

The amount of the fluidity improver may be appropriately adjusted within a range in which the effect of the present invention is exerted. The amount of the fluidity improver is preferably within a range of 0.5 to 30 parts by weight, more preferably 1.0 to 20 parts by weight relative to 100 parts by weight of the crystal nucleating agent (A). With the amount of the fluidity improver of 0.5 parts by weight or more relative to 100 parts by weight of the crystal nucleating agent (A), a sufficient fluidity-improving effect can be exerted regardless of the type of the fluidity improver used. Use of more than 30 parts by weight of the fluidity improver relative to 100 parts by weight of the crystal nucleating agent (A) hardly provides a fluidity-improving effect commensurate with the amount. When used in such an amount, some fluidity improvers tend to decrease transparency and may cause bleeding.

Method for Producing Crystal Nucleating Agent for Polyolefin Resins

The method for producing the crystal nucleating agent for polyolefin resins of the present invention is described in detail below with reference to specific examples. It is to be noted that the present invention is not necessarily limited to the following method as long as the aimed properties can be achieved.

The method for producing the crystal nucleating agent for polyolefin resins preferably includes (i) pulverization with a jet pulverizer to an average particle size of the crystal nucleating agent for polyolefin resins of 0.5 to 4.0 μm and a particle size uniformity of the crystal nucleating agent for polyolefin resins of 3 to 10. In the step (i), the average particle size of the crystal nucleating agent for polyolefin resins to be achieved is more preferably 0.5 to 3.0 μm, still more preferably 1.0 to 2.5 μm. The particle size uniformity of the crystal nucleating agent for polyolefin resins to be achieved is more preferably 4 to 7.

The method for producing the crystal nucleating agent for polyolefin resins preferably includes (ii) subjecting the pulverized product obtained in the step (i) to volume-reducing treatment to an aerated bulk density of 0.20 g/cm$^3$ or higher and a packed bulk dens of 0.30 g/cm$^3$ or higher. The aerated bulk density to be achieved is more preferably 0.24 g/cm$^3$ or higher and the packed bulk density to be achieved is more preferably 0.34 g/cm$^3$ or higher.

The step (i) is preferably performed such that the crystal nucleating agent (A) in the obtained pulverized product has a 50% value of the aspect ratio of 0.40 to 0.70 and a lower value of the aspect ratio of 0.2 to 0.4 as determined by particle image analysis. The step (i) is more preferably performed such that the 50% value is 0.45 to 0.65 as determined by particle image analysis.

In the step as for the method for producing the crystal nucleating agent for polyolefin resins having an average particle size within the range, the fine particle-form crystal nucleating agent can be obtained also in the production process by adjusting conditions in steps such as a reaction step or a post-treatment step. In such a case, steps such as the pulverization step are not required, and a usual production step including a step such as a usual reaction step or post-treatment step corresponds to the step (i).

In the step (i), if it is difficult to adjust the particle size only by conventional pulverization, a pulverized crystal nucleating agent (e.g., the crystal nucleating agent (B)) and an unpulverized crystal nucleating agent (e.g., the crystal nucleating agent (C)) may be mixed at a mixing ratio adjusted to achieve an average particle size within the above range. In this case, the step (i) includes the mixing step. When the step (i) includes the mixing step, the crystal nucleating agents to be mixed are not necessarily of the same type as long as the effect of the present invention is exerted.

The most preferred pulverizer to be used in the pulverization is a jet pulverizer. In particular, a method using a jet mill-type jet pulverizer is advantageous from the standpoint of ease of adjustment of the particle size. Here, for example, a method using a pulverizer other than a jet pulverizer, such as a wet pulverizer, may be used according to the type of the crystal nucleating agent as long as the effect of the present invention is exerted.

In the case of the method including mixing the pulverized crystal nucleating agent (A) and the unpulverized crystal nucleating agent, the ratio between them varies depending on the particle size of each crystal nucleating agent and is not necessary within a fixed range. Usually, the ratio of the pulverized product (e.g., the crystal nucleating agent (B)) to the unpulverized product (e.g., the crystal nucleating agent (C)) is preferably adjusted within a range of about 1/1 to 3/1 from the standpoint of productivity and performance. In some applications, a single type of nucleating agent may not provide a desired performance. In such a case, the method is advantageous because the crystal nucleating agent of the present invention can be obtained by pulverization of only one of the crystal nucleating agents.

The volume reduction in the step (ii) means a method of reducing the bulk density while substantially maintaining the fine particle state obtained in the step (i). Fine particles such as those obtained in the step (i) usually have a large amount of air between the particles, thus having a very low bulk density. Eliminating the air from the system can greatly reduce the volume while maintaining the fine particle state, and can also greatly increase the bulk density.

Examples of the method for eliminating air between the particles include a method including compressing the powder with a roller or a screw or a method including suctioning air out of the system with a vacuum pump. Combining two or more of these methods is most effective. Also usable is a method for reducing the volume by mixing using a vessel rotating type mixer such as a tumbler mixer, a V-type mixer, a W-type mixer, or a drum mixer.

Specific examples of the method including compressing include: a method including compressing the pulverized product using a dry compressing machine such as a compactor available from Hosokawa Micron Corporation or a roller compactor available from Freund Corp.; and a method including compressing the pulverized product while flowing the pulverized product with a screw using a compression filler such as AMO Screw-Type Packer available from Nakashima Seisakusho Co,. Ltd. or an auger filler available from Awaji Co., Ltd. or Tokyo Automatic Machinery Works, Ltd. These methods require adjustment of the conditions to maximize the volume reduction while maintaining the fine particle state. Specifically, too much compression causes fine particles to adhere to each other, preventing them from maintaining the fine particle state. This may decrease the dispersibility or solubility in resin. This tendency is particularly noticeable in crystal nucleating agents whose particles easily adhere to each other, such as diacetal compounds. The most effective method in such a case is a method including reducing the pressure in the system with a vacuum pump or the like at the same time with compression, thereby eliminating air between the particles from the system.

In cases where the crystal nucleating agent for polyolefin resin of the present invention contains the fluidity improver, the method for producing the crystal nucleating agent for polyolefin resins preferably includes, before the step (i), the step of mixing an unpulverized crystal nucleating agent (A), an unpulverized fluidity improver, and optionally an additive for polyolefin resins other than the crystal nucleating agent and the fluidity improver.

In the step of mixing the unpulverized crystal nucleating agent (A) and the unpulverized fluidity improver, it is sufficient that they are uniformly mixed to the extent that the mixture has no extreme unevenness. The method and the device to be used are not limited. A common method using a common device may be employed. For example, the unpulverized crystal nucleating agent (A) and the unpulverized fluidity improver may be mixed for several tens of minutes to several hours at room temperature with a common mixing device such as a Nauta mixer, a conical mixer, a tumbler mixer, a V-type mixer, a W-type mixer, or a drum. mixer.

In the step of mixing the unpulverized crystal nucleating agent (A) and the unpulverized fluidity improver, the ratio of the crystal nucleating agent (A) to the fluidity improver (weight ratio, crystal nucleating agent (A): fluidity improver) may be appropriately adjusted within a range in which the effect of the present invention is exerted, as described above. From the standpoint of the fluidity improving effect, the ratio is preferably within a range of 100:0.5 to 100:30, more preferably within a range of 100:1 to 100:20.

In the method for producing the crystal nucleating agent for polyolefin resins, it is possible to use a fine particle-form crystal nucleating agent (A) obtained in the production process by adjusting conditions for steps such as a reaction step or a post-treatment step and a commercially available fine particle-form fluidity improver. In this case, the step (i) may be skipped and a mixture of the fine particle-form crystal nucleating agent (A) and the fine particle-form fluidity improver may be used as is in the volume-reducing treatment in the step (ii).

When it is difficult to adjust the particle size ranges of the crystal nucleating agent (A) and the fluidity improver by the above-described method, a method including the steps below may be used:
the steps of: pulverizing the crystal nucleating agent (A) to an average particle size of 4 µm or smaller, preferably within a range of 0.5 to 4 µm, and a particle size uniformity of 3 to 10; (i-1) pulverizing the fluidity improver to an average particle size of 5 µm or smaller and a particle size uniformity of 3 or smaller; and (i-2) mixing the pulverized product of the crystal nucleating agent (A), the pulverized product of the fluidity improver obtained in the step (i-1), and optionally an additive for polyolefin resins other than the crystal nucleating agent and the fluidity improver. In other words, the above-described method preferably includes the step (i-1) and the step (i-2) between the step (i) and the step (ii).

When it is difficult to adjust the particle size within the above range by only pulverization in the step of pulverizing the crystal nucleating agent (A) or the step of pulverizing the fluidity improver, for example, the pulverized crystal nucleating agent (A) or fluidity improver and an unpulverized crystal nucleating agent (A) or fluidity improver may be mixed in the step (i-2) at a mixing ratio adjusted to achieve the particle size within the above range. In this case, the crystal nucleating agents (A) and the fluidity improvers to be mixed are not necessarily of the same type as long as the effect of the present invention is exerted.

The volume reduction in the step (ii) means a method of reducing the bulk density while maintaining the particle state of each component obtained in the step of mixing the unpulverized crystal nucleating agent (A) and the unpulverized fluidity improver or the steps (i-1) and (i-2). Fine particles such as those obtained in the step of mixing the unpulverized crystal nucleating agent (A) and the unpulverized fluidity improver usually have a large amount of air between the particles, thus having a very low bulk density. Eliminating the air from the system can greatly reduce the volume while maintaining the fine particle state, and can also greatly increase the bulk density. The volume reduction may be suitably performed by any of the above-described methods.

Method for Improving Fluidity of Crystal Nucleating Agent for Polyolefin Resins

The method for improving the fluidity of a crystal nucleating agent for polyolefin resins preferably includes pulverizing all or part of a crystal nucleating agent (A) with a jet pulverizer to provide a pulverized product having characteristics satisfying both the following requirements (a) and (b): (a) the pulverized product has an average particle size of 0.5 to 4.0 µm and a particle size uniformity of 3 to 10 as determined by laser diffraction particle size distribution measurement; and (b) the pulverized product has a 50% value of the aspect ratio of 0.40 to 0.70 and a lower value of the aspect ratio of 0.2 to 0.4 as determined by particle image analysis.

The specific method is as described in the sections "Crystal nucleating agent for polyolefin resins" and "Method for producing crystal nucleating agent for polyolefin resins". The method for improving the fluidity is not necessarily limited to the following method as long as the aimed properties can be achieved.

Polyolefin Resin Composition

The present invention also relates to a polyolefin resin composition containing a polyolefin resin and the crystal nucleating agent for polyolefin resins or a crystal nucleating agent for polyolefin resins produced by the production method of a crystal nucleating agent for polyolefin resins. The polyolefin resin composition of the present invention can be easily obtained by dry-blending the crystal nucleating agent of the present invention, a polyolefin resin, and optionally other additive(s) for polyolefin resins at room temperature and then melt-mixing them under a predetermined condition.

The amount of the crystal nucleating agent for polyolefin resins of the present invention in the polyolefin resin is not limited as long as it can exert a nucleating agent effect as a crystal nucleating agent for polyolefin resins. The amount varies depending on the formulation of the composition and thus is not uniquely determined. In cases where the crystal nucleating agent for polyolefin resins of the present invention contains only the crystal nucleating agent (A), the amount is preferably 0.001 to 10 parts by weight, more preferably 0.01 to 5 parts by weight relative to 100 parts by weight of the polyolefin resin. In cases where the crystal nucleating agent for polyolefin resins of the present invention contains an additive such as the fluidity improver, the amount of the crystal nucleating agent (A) is preferably 0.001 to 10 parts by weight, more preferably 0.01 to 5 parts by weight relative to 100 parts by weight of the polyolefin resin, and the amount of the fluidity improver is preferably 0.000005 to 3 parts by weight, more preferably 0.0001 to 1 parts by weight relative to 100 parts by weight of the polyolefin resin.

Polyolefin Resin

The polyolefin resin is not particularly limited as long as the effect of the present invention is exerted, and conventionally known polyolefin resins are usable. Examples thereof include polyethylene resins, polypropylene resins, polybutene resins, polymethylpentene resins, and polybutadiene resins. More specific examples thereof include high-density polyethylene, medium-density polyethylene, linear polyethylene, ethylene copolymers having an ethylene content of 50% by weight or higher, preferably 70% by weight or higher, propylene homopolymers, propylene copolymers having a propylene content of 50% by weight or higher, preferably 70% by weight or higher, butene homopolymers, butene copolymers having a butene content of 50% by weight or higher, preferably 70% by weight or higher, methylpentene homopolymers, methylpentene copolymers having a methylpentene content of 50% by weight or higher, preferably 70% by weight or higher, and polybutadiene. The above copolymers each may be a random copolymer or a block copolymer. Moreover, in cases where these resins are each a stereoregular resin, it may be an isotactic resin or a syndiotactic resin. Specific examples of comonomers that can constitute the copolymers include: C2-C12 α-olefins such as ethylene, propylene, butene, pentene, hexene, heptene, octene, nonene, decene, undecene, and dodecene; bicyclo monomers such as 1,4-endomethylenecyclohexene; (meth) acrylates such as methyl (meth) acrylate and ethyl (meth) acrylate; and vinyl acetate.

Examples of the catalyst usable for production of the polymer include, in addition to commonly used ziegler-natta catalysts, catalyst systems combining a catalyst including a carrier containing magnesium halides (e.g., magnesium chloride) as a main component and a transition metal compound (e.g., titanium halides such as titanium trichloride and titanium tetrachloride) supported on the carrier with an alkyl aluminum compound (e.g., triethyl aluminum, diethyl aluminum chloride), and metallocene catalysts.

The melt flow rate (hereafter, abbreviated as "MFR", JIS K 7210-1999) of the polyolefin resin according to the present invention is selected as appropriate according to the molding method employed. The recommended MFR is commonly about 0.01 to 200 g/10 min, preferably about 0.05 to 100 g/10 min.

Other Additives

As described above, the polyolefin resin composition of the present invention may contain other additive(s) for polyolefin resins according to the intended use or application thereof, within a range that the effect of the present invention is not impaired.

Examples of the additive that, can be added to the polyolefin resin composition include various additives listed in "The Tables of Positive Lists of Additives" edited by Japan Hygienic Olefin And Styrene Plastics Association (January, 2002). Specific examples of the various additives include fluorescent brighteners (e.g., 2, 5-thiophene diyl(5-tert-butyl-1,3-benzoxazole), 4,4'-bis(benzoxazol-2-yl)stilbene), antioxidants, stabilizers (e.g., metal compounds, epoxy compounds, nitrogen compounds, phosphorus compounds, sulfur compounds), ultraviolet absorbers (e.g., benzophenone compounds, benzotriazole compounds), surfactants, lubricants (e.g., aliphatic hydrocarbons such as paraffin and wax, C8-C22 higher fatty acids, C8-C22 higher fatty acid metal (Al, Ca) salts, C8-C22 higher aliphatic alcohols, polyglycol, esters of C4-C22 higher fatty acids and C4-C18 aliphatic monovalent alcohols, C8-C22 higher fatty acid amides, silicone oil, rosin derivatives), fillers (e.g., talc, hydrotalcite, mica, zeolite, perlite, diatom earth, calcium carbonate, glass fiber), foaming agents, foaming aids, polymer additives, plasticizers (e.g., dialkylphthalate, dialkylhexahydrophthalate), crosslinking agents, crosslinking accelerators, antistatic agents, flame retardants, dispersants, organic/inorganic pigments (e.g., indigo compounds, phthalocyanine compounds, anthraquinone compounds, ultramarine compounds, cobalt aluminate compounds), processing aids, and other nucleating agents.

In cases where any of these additives is used, it may be used in a usual amount as long as the effect of the present invention is not disturbed. For example, the amount relative to 100 parts by weight of the polyolefin resin is normally preferably about 0.0001 to 100 parts by weight, more preferably about 0.001 to 50 parts by weight.

In cases where any of these additives is added, the additive is commonly mixed with the polyolefin resin together with the crystal nucleating agent for polyolefin resins of the present invention to prepare the polyolefin resin composition. Part of the additive may be added during the production of the crystal nucleating agent for polyolefin resins of the present invention.

Examples of the antioxidant include phenolic antioxidants, phosphite antioxidants, and sulfur antioxidants. Specific examples of the antioxidants include: phenolic antioxidants such as 2,6-di-tert-butylphenol, tetrakis[methylene-3-(3,5-tert-butyl-4-hydroxyphenol)propionate]methane, and 2-hydroxy-4-methoxybenzophenone; sulfur antioxidants such as alkyl disulfide, thiodipropionates, and benzothiazole; and phosphite antioxidants such as tris(nonylphenyl) phosphite, diphenyl isodecyl phosphite, triphenyl phosphite, tris(2,4-di-tert-butylphenyl)phosphite, and 3,9-bis(2,6-tert-butyl-4-methylphenoxy)-2,4,8,10-tetraoxa-3,9-diphosphaspiro[5,5]undecane. Among these, particularly recommended are tetrakis [methylene-3-(3, 5-di-t-butyl-4-hydroxyphenyl)propionate]methane that is a phenolic antioxidant, and tris(2,4-di-tert-butylphenyl)phosphite and 3,9-bis(2,6-tert-butyl-4-methylphenoxy)-2,4,8,10-tetraoxa-3,9-diphosphaspiro[5,5]undecane that are phosphite antioxidants.

Polyolefin Resin Molded Article

The present invention also relates to a polyolefin resin molded article that is produced using the polyolefin resin composition as a raw, material. The polyolefin resin molded article of the present invention is obtainable by molding the polyolefin resin composition of the present invention by a commonly used molding method. The molding method is not particularly limited as long as the effect of the present invention is exerted. Any of conventionally known molding methods such as injection molding, extrusion molding, blow molding, pressure molding, rotational molding, and film molding may be employed.

The polyolefin resin molded article obtained as above is excellent in optical characteristics (e.g., transparency) and mechanical properties (e.g., impact resistance) and is very useful for various applications including automobile parts, electric parts, machine components, and commodities in the form of a molded article, a sheet, or a film.

EXAMPLES

The present invention is more specifically described in the following with reference to, but not limited to, the examples the abbreviations of the compounds used in examples and application examples, and the measurement process of each property are mentioned below.

Characteristics of Crystal Nucleating Agent (A)

(1) Measurement of particle size distribution

The particle size distribution was measured with a laser diffraction particle size distribution analyzer ("Mastersizer 3000" available from Malvern Instruments) by the following method. First, a sample was dispersed in an aqueous solution containing a nonionic surfactant as a dispersant by sufficient stirring in a wet measurement cell, the resulting mixture was further stirred and circulated in the analyzer and sufficiently uniformly dispersed in the analyzer under irradiation with ultrasonic wave, and the particle size distribution of the sample was measured under irradiation with ultrasonic wave. The volume-based cumulative 50% particle size (d50) was determined as the average of the particle size from the obtained particle size distribution. Similarly, the volume-based cumulative 60% particle size (d60) and the volume-based cumulative 10% particle size (d10) were determined from the obtained particle size distribution. The d60/d10 ratio was calculated as the particle size uniformity. A d60/d10 value closer to 1 indicates a more uniform particle size, that is, a particle size distribution closer to monodispersion.

(2) Measurement of aspect ratio

The aspect ratio was measured with a flow particle image analyzer ("FPIA-3000" available from Malvern Instruments) by the following method. A surfactant as a dispersant was added to 30 mL of ion-exchanged water in a measurement container, and 20 mg of a sample was then added thereto and uniformly dispersed by dispersing treatment for 5 minutes. Thus, a measurement sample was prepared. The measurement sample was analyzed and the aspect ratio distribution was determined with analyzing software included with the analyzer. The cumulative 50% value and the cumulative 10% value were determined from the distribution as, respectively, the 50% value indicating the median of the aspect ratio and the lower value serving as an index of the proportion of high-aspect-ratio particles. As described above, a greater lower value indicates a smaller proportion of high-aspect-ratio particles.

Characteristics of Fluidity Improver (3) Measurement of particle size distribution The particle size distribution was measured as in "(1) Method for measuring particle size distribution of crystal nucleating agent (A)". Similarly, the average of the particle size and the particle size uniformity were determined.

Characteristics of Crystal Nucleating Agent for Polyolefin Resins (4) Measurement of particle size distribution The particle size distribution was measured as in "(1) Method for measuring particle size distribution of crystal nucleating agent (A)". Similarly, the average of the particle size and the particle size uniformity were determined.

(5) Measurement of bulk density

A funnel was perpendicularly held at a position of 2 cm above the opening section of a 100-$cm^3$ measuring cylinder with its axis aligned with the axis of the measuring cylinder. A crystal nucleating agent for polyolefin resins in an amount of 100 $cm^3$ was slowly (without pressurization) put into the 100-$cm^3$ measuring cylinder through the funnel. The weight of the crystal nucleating agent for polyolefin resins in the measuring cylinder was measured to 0.1-g units using a scale. The aerated bulk density was obtained by the following equation (1) using the obtained weight. Subsequently, the measuring cylinder was vertically dropped onto a rubber sheet from a height of 5 cm (tapping) for 50 times. The volume of the crystal nucleating agent for polyolefin resins in the measuring cylinder was read to 0.1-$cm^3$ units, and the packed bulk density was obtained using the following equation (2).

Equation (1):

Aerated bulk density (g/$cm^3$)=Weight of crystal nucleating agent for polyolefin resins in measuring cylinder (g)/100 $cm^3$ Equation (2):

Packed bulk density (g/$cm^3$)=Weight of crystal nucleating agent for polyolefin resins in measuring cylinder (g)/Volume of crystal nucleating agent for polyolefin resins after tapping ($cm^3$)

Evaluation of Fluidity (6) Measurement of angle of repose

Under the conditions of a temperature of 25° C. and a humidity of 60%, the crystal nucleating agent for polyolefin resins in an amount of 30 g was fed into a funnel having an conical part with a diameter of 9 cm and a tube with a diameter of 1 cm from the height of 1 cm above the upper edge of the funnel, and dropped without vibration onto a circular stage with a diameter of 9 cm placed 10 cm below the lower outlet of the funnel. The height of the conical deposition of the dropped crystal nucleating agent was measured, and the angle formed between the horizontal plane and the generatrix was obtained by calculation as the angle of repose (unit: degree). A smaller angle of repose indicates better powder fluidity.

(7) Powder fluidity test (funnel test)

The crystal nucleating agent for polyolefin resins was fed into a funnel having a conical part with a diameter of 15 cm and a tube with a diameter of 1.5 cm from the height of 5 cm above the upper edge of the funnel, and dropped through a lower outlet without vibration. The fluidity of the crystal nucleating agent for polyolefin resins was evaluated based on the discharge state of the crystal nucleating agent for polyolefin resins from the funnel on a four-point scale or a five-point scale in accordance with the following criteria.

(Four-point evaluation scale)

Excellent: The entire crystal nucleating agent for polyolefin resins was immediately discharged from the funnel and almost no deposition was found on the inner wall of the funnel.

Good: The crystal nucleating agent for polyolefin resins was slightly left in the funnel without being discharged but the residual crystal nucleating agent for polyolefin resins in the funnel was entirely discharged with application of a small impact.

Fair: The crystal nucleating agent for polyolefin resins was left in the funnel without being discharged and complete discharge of the residual crystal nucleating agent for polyolefin resins in the funnel was difficult only with application of a small impact.

Poor: A large amount of the crystal nucleating agent for polyolefin resins was left in the funnel without being discharged and discharge of the residual crystal nucleating agent for polyolefin resins in the funnel was difficult even with application of an impact.

(Five-point evaluation scale)

5: The crystal nucleating agent for polyolefin resins was very immediately discharged from the funnel and almost no deposition was found on the inner wall of the funnel.

4: The entire crystal nucleating agent for polyolefin resins was discharged from the funnel and almost no deposition was found on the inner wall of the funnel.

3: The crystal nucleating agent for polyolefin resins was slightly left in the funnel without being discharged but the residual crystal nucleating agent for polyolefin resins in the funnel was entirely discharged with application of a small impact.

2: The crystal nucleating agent for polyolefin resins was left in the funnel without being discharged and complete discharge of the residual crystal nucleating agent for polyolefin resins in the funnel was difficult only with application of a small impact.

1: A large amount of the crystal nucleating agent for polyolefin resins was left in the funnel without being discharged and discharge of the residual crystal nucleating agent for polyolefin resins in the funnel was difficult even with application of an impact.

Characteristics of Polyolefin Resin Molded Article (8) Measurement of haze value The haze value was measured using a haze meter available from Toyo Seiki Seisakusho, Ltd. by a method in conformity with JIS K 7136 (2000). The evaluation sample used was a polypropylene resin molded article that was a 1-mm-thick injection molded article. A smaller haze value indicates better transparency.

(9) Evaluation of white spots

The evaluation sample used was a polyolefin resin molded article (50 mm×50 mm×1 mm) obtained by injection molding. The number of white spots in the molded article was visually counted. The numbers of white spots on five sheets of the samples was averaged, and the obtained value was used as the number of white spots of the sample. The obtained results were classified and rated on a 3-point scale.

Excellent: The number of white spots is less than 3. No problems at all in terms of the performance of the molded article.

Good: The number of white spots is within a range of 3 to 15. No problems in terms of the performance as the nucleating agent but there may possibly be an influence of an undispersed matter in terms of other physical properties.

Poor: The number of white spots is more than 15. The effect in terms of the performance as the nucleating agent is obviously insufficient and an undispersed matter may highly possibly cause a problem in terms of various physical properties.

Abbreviations of compounds in examples

MDBS: 1,3:2,4-bis-O-(p-methylbenzylidene)-O-sorbitol

EDBS: 1,3:2,4-bis-O-(p-ethylbenzylidene)-D-sorbitol

DMDBS: 1,3:2,4-bis-O-(3', 4'-dimethylbenzylidene)-D-sorbitol.

PDBN: 1,3:2,4-bis-O-(p-n-propylbenzylidene)-1-n-propylsorbitol

CDBS: 1,3:2,4-bis-O-(p-chlorobenzylidene)-D-sorbitol

StCa: calcium stearate

StZn: zinc stearate

Example 1

DMDBS having a common particle size (GEL ALL DXR available from New Japan Chemical Co., Ltd.) was pulverized with a jet pulverizer "Single Track Jet Mill STJ-400" available from Seishin Enterprise Co., Ltd. at room temperature under the conditions of a pressure of 0.7 MPa and a throughput of 30 kg/hour. Thus, a fine particle-form crystal nucleating agent for polyolefin resins was prepared. The particle size distribution of the obtained fine particle-form crystal nucleating agent for polyolefin resins was measured. Table 1 shows the average and the uniformity determined from the particle size distribution. The aspect ratio of the obtained fine particle-form crystal nucleating agent for polyolefin resins was measured. Table 1 shows the 50% value and the lower value determined from the aspect ratio distribution. Subsequently, the evaluation of the powder fluidity by the powder fluidity test (funnel test) was performed on the obtained crystal nucleating agent for polyolefin resins. Table 1 shows the results.

Next, 100 parts by weight of a polypropylene random copolymer (MFR=7 g/10 min (load: 2160 g, temperature: 230° C.), R-720 available from Prime Polymer Co., Ltd.) as a polyolefin rein, 0.2 parts by weight of the obtained crystal nucleating agent for polyolefin resins as a crystal nucleating agent for polyolefin resins, and 0.05 parts by weight of calcium stearate (available from Nitto Kasen. Co., Ltd., product name: Ca-St), 0.05 parts by weight of tetrakis[methylene-3-(3,5-di-tert-butyl-4-hydroxyphenyl)propionate]methane (available from BASF Japan Ltd., product name: "IRGANOX1010"), and 0.05 parts by weight of tetrakis (2,4-di-tert-butylphenyl)phosphite (available from BASF Japan Ltd., product name: "IRGAFOS168") as other additives were dry-blended. The dry-blended mixture was melted and mixed using a single screw extruder (VS-20 available from Tanabe Plastics Machinery Co., Ltd.) at a barrel temperature of 250° C., and the extruded strands were cooled and cut using a pelletizer. Thus, a polyolefin resin composition was prepared.

Next, the obtained polyolefin resin composition was molded using an injection molding apparatus (NS40-5A available from Nissei Plastic Industrial Co., Ltd.) under the conditions of an injection molding temperature (heating temperature) of 240° C. and a die temperature (cooling temperature) of 40° C. to provide a 1-mm-thick polyolefin resin molded article. The obtained molded article was used as an evaluation sample in measurement of the haze value. Table 1 shows the results. The evaluation of white spots in the same molded article snowed that the crystal nucleating agent for polyolefin resins exhibited very good dispersibility in polyolefin resin.

Example 2

The crystal nucleating agent for polyolefin resins of the present invention was prepared as Example 1 except that EDBS was used instead of DMDBS. The obtained crystal nucleating agent for polyolefin resins was subjected to measurement of the particle size distribution and the aspect ratio and evaluation of the powder fluidity. Table 1 shows the results. Subsequently, a polypropylene resin molded article was obtained as in Example 1. The haze value of the obtained molded article was measured. Table 1 shows the results. The results of evaluation of white spots showed that the crystal nucleating agent for polyolefin resins had very good dispersibility in polyolefin resin.

Example 3

The crystal nucleating agent for polyolefin resins of the present invention was prepared as in Example 1 except that PDBN was used instead of DMDBS. The obtained crystal nucleating agent for polyolefin resins was subjected to measurement of the particle size distribution and the aspect ratio and evaluation of the powder fluidity. Table 1 shows the results. Subsequently, a polypropylene resin molded article was obtained as in Example 1. The haze value of the obtained molded article was measured. Table 1 shows the results. The results of evaluation of white spots showed that the crystal nucleating agent for polyolefin resins had very good dispersibility in polyolefin resin.

Comparative Example 1

The fine particle-form crystal nucleating agent for polyolefin resins obtained in Example 1 was pulverized again under the same conditions as those in Example 1 to prepare a finer particle-form crystal nucleating agent for polyolefin resins. Thus, a crystal nucleating agent for polyolefin resins outside the present invention was obtained. The obtained crystal nucleating agent for polyolefin resins was subjected to measurement of the particle size distribution and the aspect ratio and evaluation of the powder fluidity. Table 1 shows the results. Subsequently, a polypropylene resin molded article was obtained as in Example 1. The haze value of the obtained molded article was measured. Table 1 shows the results. The results of evaluation of white spots showed that the crystal nucleating agent had very good dispersibility in polyolefin resin.

Comparative Example 2

The powder fluidity of DMDBS having a common particle size before pulverization was evaluated. Table 1 shows the results along with the particle size distribution values and the aspect ratio values. Subsequently, a polypropylene resin molded article was obtained as in Example 1. The haze value of the obtained molded article was measured. Table 1 shows the results. The results of evaluation of white spots showed that the crystal nucleating agent had good dispersibility in polyolefin resin.

Comparative Example 3

The powder fluidity of EDBS having a common particle size before pulverization was evaluated. Table 1 shows the results along with the particle size distribution values and the aspect ratio values. Subsequently, a polypropylene resin molded article was obtained as in Example 1. The haze value of the obtained molded article was measured. Table 1 shows the results. The results of evaluation of white spots showed that the crystal nucleating agent had good dispersibility in polyolefin resin.

Comparative Example 4

The powder fluidity of PDBN having a common particle size before pulverization was evaluated. Table 1 shows the results along with the particle size distribution values and the aspect ratio values. Subsequently, a polypropylene resin molded article was obtained as in Example 1. The haze value of the obtained molded article was measured. Table 1 shows the results. The results of evaluation of white spots showed that the crystal nucleating agent had very good dispersibility in polyolefin resin.

TABLE 1

| | | Example | | | Comparative Example | | | |
|---|---|---|---|---|---|---|---|---|
| | | 1 | 2 | 3 | 1 | 2 | 3 | 4 |
| Type of crystal nucleating agent (A) | | DMDBS | EDBS | PDBN | DMDBS | DMDBS | EDBS | PDBN |
| (1) Characteristics of crystal nucleating agent for polyolefin resins | | | | | | | | |
| Particle size distribution | Average (μm) | 1.6 | 2.1 | 1.4 | 0.8 | 6.2 | 8.2 | 5.9 |
| | Uniformity | 5.2 | 5.6 | 6.2 | 2.9 | 3.4 | 3.5 | 4.6 |
| Aspect ratio | 50% value | 0.61 | 0.53 | 0.55 | 0.72 | 0.29 | 0.27 | 0.31 |
| | Lower value | 0.31 | 0.25 | 0.35 | 0.44 | 0.14 | 0.11 | 0.13 |
| Powder fluidity test | | Excellent | Excellent | Excellent | Fair | Poor | Poor | Poor |
| (2) Evaluation of molded article | | | | | | | | |
| Haze value | | 8 | 9 | 12 | 7 | 10 | 11 | 12 |

Example 4

The fine particle-form crystal nucleating agent for polyolefin resins obtained in Comparative Example 1 was used as a crystal nucleating agent (B), and DMDBS before pulverization was used as a crystal nucleating agent (C). The crystal nucleating agents (B) and (C) were mixed at room temperature at a (B)/(C) ratio of 2/1 (weight ratio). Thus, the crystal nucleating agent for polyolefin resins of the present invention was prepared. The obtained crystal nucleating agent for polyolefin resins was subjected to measurement of the particle size distribution and the aspect ratio and evaluation of the powder fluidity. Table 2 shows the results. Subsequently, a polypropylene resin molded article was obtained as in Example 1. The haze value of the obtained molded article was measured. Table 2 shows the results. The results of evaluation of white spots showed that the crystal nucleating agent for polyolefin resins had very good dispersibility in polyolefin resin.

Example 5

A crystal nucleating agent for polyolefin resins was prepared as in Example 4 except that EDBS before pulverization was used as the crystal nucleating agent (C). The obtained crystal nucleating agent for polyolefin resins was subjected to measurement of the particle size distribution and the aspect ratio and evaluation of the powder fluidity. Table 2 shows the results. Subsequently, a polypropylene resin molded article was obtained as in Example 1. The haze value of the obtained molded article was measured. Table 2 shows the results. The results of evaluation of white spots showed that the crystal nucleating agent for polyolefin resins had very good dispersibility in polyolefin resin.

Example 6

A crystal nucleating agent for polyolefin resins was prepared as in Example 4 except that unpulverized CDBS (average particle size: 7.5, particle size uniformity: 4.1) was used as the crystal nucleating agent (C). The obtained crystal nucleating agent for polyolefin resins was subjected to measurement of the particle size distribution and the aspect ratio and evaluation of the powder fluidity. Table 2 shows the results. Subsequently, a polypropylene resin molded article was obtained as in Example 1. The haze value of the obtained molded article was measured.

Table 2 shows the results. The results of evaluation of white spots showed that the crystal nucleating agent for polyolefin resins had very good dispersibility in polyolefin resin.

TABLE 2

|  |  | Example | | |
|---|---|---|---|---|
|  |  | 4 | 5 | 6 |
| Type of crystal nucleating agent B | | DMDBS | DMDBS | DMDBS |
| Type of crystal nucleating agent C | | DMDBS | EDBS | CDBS |
| (B)/(C) ratio | | 2/1 | 2/1 | 2/1 |
| (1) Characteristics of crystal nucleating agent for polyolefin resins | | | | |
| Particle size distribution | Average (μm) | 2.2 | 2.5 | 2.0 |
|  | Uniformity | 6.4 | 6.3 | 6.1 |
| Aspect ratio | 50% value | 0.62 | 0.58 | 0.59 |
|  | Lower value | 0.31 | 0.32 | 0.29 |
| Powder fluidity test | | Excellent | Excellent | Excellent |
| 2) Evaluation of molded article | | | | |
| Haze value | | 8 | 9 | 9 |

The results in Table 1 and Table 2 show that the crystal nucleating agents for polyolefin resins having characteristics within the scope of the present invention (Examples 1 to 6) have very excellent powder fluidity as compared with the crystal nucleating agents for polyolefin resins having characteristics outside the scope of the present invention. The results in Table 1 and Table 2 also show that the crystal nucleating agent for polyolefin resins of the present invention is equal to or greater than conventional crystal nucleating agents for polyolefin resins in terms of the original performance as a crystal nucleating agent for polyolefin resins. These results show that use of the crystal nucleating agent for polyolefin resins of the present invention greatly improves workability upon blending with a polyolefin resin and during the molding after the blending. The results further show that the polyolefin resin composition and the molded article thereof containing the crystal nucleating agent for polyolefin resins of the present invention have very excellent performance and are very useful in various applications.

Example 7

DMDBS having a common particle size (GEL ALL DXR available from New Japan Chemical Co., Ltd.) was pulverized to a particle size distribution within the scope of the present invention with a jet pulverizer "Single Track Jet Mill STJ-400" available from Seishin Enterprise Co., Ltd. at room temperature under the conditions of a pressure of 0.7 MPa and a throughput of 30 kg/hour. Thus, a fine particle-form crystal nucleating agent for polyolefin resins was prepared. Subsequently, the fine particle-form crystal nucleating agent for polyolefin resins was put in a simple compression volume reduction container and pressurized at 0.25 MPa at room temperature, whereby volume-reducing treatment was performed to achieve the aerated bulk density shown in Table 3. Thus, a fine particle-form crystal nucleating agent for polyolefin resins with a reduced volume according to the present invention was obtained. The obtained fine particle-form crystal nucleating agent for polyolefin resins with a reduced volume according to the present invention was subjected to measurement of the particle size distribution. Table 3 shows the average and the uniformity determined from the particle size distribution. The aspect ratio of the obtained fine particle-form crystal nucleating agent for polyolefin resins was measured. Table 3 shows the 50% value and the lower value determined from the aspect ratio distribution. Subsequently, the bulk density (aerated bulk density and packed bulk density) and the angle of repose of the obtained crystal nucleating agent for polyolefin resins were measured, and the evaluation of the powder fluidity was performed by the powder fluidity test (funnel test). Table 3 shows the results.

Next, 100 parts by weight of a polypropylene random copolymer (MFR=7 g/10 min (load: 2160 g, temperature: 230° C.), R-720 available from Prime Polymer Co., Ltd.) as a polyolefin resin, 0.2 parts by weight of the crystal nucleating agent for polyolefin resin obtained above as a crystal nucleating agent for polyolefin resin, and 0.05 parts by weight of calcium stearate available from Nitto Kasei Co., Ltd., product name: "Ca-St"), 0.05 parts by weight of tetrakis [methylene-3-(3, 5-di-tert-butyl-4-hydroxyphenyl) propionate]methane (available from BASF Japan Ltd., product name: "IRGANOX1010"), and 0.05 parts by weight of tetrakis(2,4-di-tert-butylphenyl)phosphite (available from BASF Japan Ltd., product name: "IRGAFOS168") as other additives were dry-blended. The dry-blended mixture was melted and mixed using a single screw extruder (VS-20 available from Tanabe Plastics Machinery Co., Ltd.) at a barrel temperature of 250° C., and the extruded strands were cooled and cut using a pelletizer. Thus, a polyolefin resin composition was prepared.

Next, the obtained polyolefin resin composition was molded using an injection molding apparatus (NS40-5A available from Nissei Plastic Industrial Co., Ltd.) under the conditions of an injection molding temperature (heating temperature) of 240° C. and a die temperature (cooling temperature) of 40° C. to provide a 1-mm-thick polyolefin resin molded article. The haze value of the obtained molded article as an evaluation sample was measured. The evaluation of white spots was also performed using the same evaluation sample. Table 3 shows the results.

Example 8

The crystal nucleating agent for polyolefin resins of the present invention was obtained as in Example 7 except that the pressure during pulverization was changed to 0.10 MPa. The obtained crystal nucleating agent for polyolefin resins was subjected to measurement of the particle size distribution, the aspect ratio, the bulk density, and the angle of repose and evaluation of the powder fluidity. Table 3 shows the results. Subsequently, a polypropylene resin molded article was obtained as in Example 7 using the obtained crystal nucleating agent for polyolefin resins. Measurement of the haze value and evaluation of white spots were performed using the obtained molded article. Table 3 shows the results.

Example 9

The crystal nucleating agent for polyolefin resins of the present invention was obtained as in Example 8 except that the final aerated bulk density in the volume-reducing treatment was changed to the aerated bulk density shown in Table 3. The obtained crystal nucleating agent for polyolefin resins was subjected to measurement of the particle size distribution, the aspect ratio, the bulk density, and the angle of repose and evaluation of the powder fluidity. Table 3 shows the results. Subsequently, a polypropylene resin molded article was obtained as in Example 7 using the obtained crystal nucleating agent for polyolefin resins. Measurement of the haze value and evaluation of white spots were performed using the obtained molded article. Table 3 shows the results.

Example 10

The crystal nucleating agent for polyolefin resins of the present invention was obtained as in Example 7 except that MDBS was used instead of DMDBS. The obtained crystal nucleating agent for polyolefin resins was subjected to measurement of the particle size distribution, the aspect ratio, the bulk density, and the angle of repose and evaluation of the powder fluidity. Table 3 shows the results. Subsequently, a polypropylene resin molded article was obtained as in Example 7 using the crystal nucleating agent for polyolefin resins. Measurement of the haze value and evaluation of white spots were performed using the obtained molded article. Table 3 shows the results.

Example 11

The crystal nucleating agent for polyolefin resins of the present invention was obtained as in Example 7 except that EDBS was used instead of DMDBS. The obtained crystal nucleating agent for polyolefin resins was subjected to measurement of the particle size distribution, the aspect ratio, the bulk density, and the angle of repose and evaluation of the powder fluidity. Table 3 shows the results. Subsequently, a polypropylene resin molded article was obtained as in Example 7 using the crystal nucleating agent for polyolefin resins. Measurement of the haze value and evaluation of white spots were performed using the obtained molded article. Table 3 shows the results.

Example 12

The crystal nucleating agent for polyolefin resins of the present invention was obtained as in Example 7 except that PDBN was used instead of DMDBS. The obtained crystal nucleating agent for polyolefin resins was subjected to measurement of the particle size distribution, the aspect ratio, the bulk density, and the angle of repose and evaluation of the powder fluidity. Table 3 shows the results. Subsequently, a polypropylene resin molded article was obtained as in Example 7 using the crystal nucleating agent for polyolefin resins. Measurement of the haze value and evaluation of white spots were performed using the obtained molded article. Table 3 shows the results.

Comparative Example 5

The DMDBS of Example 7 after pulverization but before the volume-reducing treatment was subjected to the measurement of the aspect ratio, the bulk density, and the angle of repose and evaluation of the powder fluidity. Table 3 shows the results along with the particle size distribution values. Subsequently, a polypropylene resin molded article was obtained as in Example 7. Measurement of the haze value and evaluation of white spots were performed using the obtained molded article. Table 3 shows the results.

Comparative Example 6

The DMDBS of Example 7 before pulverization was used as it was. The DMDBS was subjected to volume-reducing treatment as in Example 7 to prepare a crystal nucleating agent for polyolefin resins outside the scope of the present invention. The obtained crystal nucleating agent for polyolefin resins was subjected to measurement of the aspect ratio, the bulk density, and the angle of repose and evaluation of the powder fluidity. Table 3 shows the results along with the particle size distribution values. Subsequently, a polypropylene resin molded article was obtained as in Example 7. Measurement of the haze value and evaluation of white spots were performed using the obtained molded article. Table 3 shows the results.

Comparative Example 7

The DMDBS of Example 7 before pulverization was used as it was without volume-reducing treatment. The DMDBS was subjected to measurement of the particle size distribution, the aspect ratio, the bulk density, and the angle of repose and evaluation of the powder fluidity. Table 3 shows the results along with the particle size distribution values. Subsequently, a polypropylene resin molded article was obtained as in Example 7. Measurement of the haze value and evaluation of white spots were performed using the obtained molded article. Table 3 shows the results.

Comparative Example 8

The MDBS of Example 10 before pulverization was used as it was without volume-reducing treatment. The MDBS was subjected to measurement of the particle size distribution, the aspect ratio, the bulk density, and the angle of repose and evaluation of the powder fluidity. Table 3 shows the results along with the particle size distribution values. Subsequently, a polypropylene resin molded article was obtained as in Example 7. Measurement of the haze value and evaluation of white spots were performed using the obtained molded article. Table 3 shows the results.

Comparative Example 9

The EDBS of Example 11 before pulverization was used as it was without volume-reducing treatment. The EDBS was subjected to measurement of the particle size distribution, the aspect ratio, the bulk density, and the angle of repose and evaluation of the powder fluidity. Table 3 shows the results along with the particle size distribution values. Subsequently, a polypropylene resin molded article was obtained as in Example 7. Measurement of the haze value and evaluation of white spots were performed using the obtained molded article. Table 3 shows the results.

Comparative Example 10

The PDBM of Example 12 before pulverization was used as it was without volume-reducing treatment. The PDBN was subjected to measurement of the particle size distribution, the aspect ratio, the bulk density, and the angle of repose and evaluation of the powder fluidity. Table 3 shows the results along with the particle size distribution values. Subsequently, a polypropylene resin molded article was obtained as in Example 7. Measurement of the haze value and evaluation of white spots were performed using the obtained molded article. Table 3 shows the results.

subjected to measurement of the particle size distribution, the aspect ratio, the bulk density, and the angle of repose and evaluation of the powder fluidity. Table 4 shows the results. Subsequently, a polypropylene resin molded article was obtained as in Example 7 using the crystal nucleating agent for polyolefin resins. Measurement of the haze value and evaluation of white spots were performed using the obtained molded article. Table 4 shows the results.

Example 14

The finer particle-form crystal nucleating agent (DMDBS) obtained in Example 7 and the EDBS of Example 8 before pulverization were mixed at the ratio shown in Table 4, followed by volume-reducing treatment as in Example 7. Thus, the crystal nucleating agent for polyolefin resins of the present invention was obtained. The obtained crystal nucleating agent for polyolefin resins was subjected to measurement of the particle size distribution, the aspect

TABLE 3

|  |  | Example | | | | | |
| --- | --- | --- | --- | --- | --- | --- | --- |
|  |  | 7 | 8 | 9 | 10 | 11 | 12 |
| Type of crystal nucleating agent (A) | | DMDBS | DMDBS | DMDBS | MDBS | EDBS | PDBN |
| (1) Characteristics of crystal nucleating agent for polyolefin resins | | | | | | | |
| Particle size distribution | Average (μm) | 1.6 | 2.3 | 2.3 | 1.4 | 2.1 | 1.4 |
|  | Uniformity | 5.2 | 6.2 | 6.3 | 5.3 | 5.6 | 6.2 |
| Aspect ratio | 50% value | 0.61 | 0.63 | 0.65 | 0.52 | 0.59 | 0.55 |
|  | Lower value | 0.31 | 0.37 | 0.39 | 0.38 | 0.33 | 0.34 |
| Bulk density | Aerated bulk density (g/cm$^3$) | 0.30 | 0.28 | 0.25 | 0.31 | 0.29 | 0.28 |
|  | Packed bulk density (g/cm$^3$) | 0.41 | 0.39 | 0.35 | 0.40 | 0.43 | 0.40 |
| Angle of repose | Degrees | 41 | 42 | 41 | 41 | 42 | 42 |
|  | Powder fluidity test | 5 | 5 | 5 | 5 | 5 | 5 |
| (2) Evaluation of molded article | | | | | | | |
| Haze value | | 8 | 8 | 8 | 8 | 9 | 12 |
| Evaluation of white spots | | Excellent | Excellent | Excellent | Excellent | Excellent | Excellent |

|  |  | Comparative Example | | | | | |
| --- | --- | --- | --- | --- | --- | --- | --- |
|  |  | 5 | 6 | 7 | 8 | 9 | 10 |
| Type of crystal nucleating agent (A) | | DMDBS | DMDBS | DMDBS | MDBS | EDBS | PDBN |
| (1) Characteristics of crystal nucleating agent for polyolefin resins | | | | | | | |
| Particle size distribution | Average (μm) | 1.6 | 6.2 | 6.2 | 7.0 | 8.2 | 5.9 |
|  | Uniformity | 5.2 | 3.4 | 3.4 | 3.2 | 3.5 | 4.6 |
| Aspect ratio | 50% value | 0.61 | 0.29 | 0.29 | 0.29 | 0.27 | 0.31 |
|  | Lower value | 0.31 | 0.14 | 0.14 | 0.11 | 0.11 | 0.13 |
| Bulk density | Aerated bulk density (g/cm$^3$) | 0.18 | 0.21 | 0.21 | 0.20 | 0.16 | 0.21 |
|  | Packed bulk density (g/cm$^3$) | 0.26 | 0.35 | 0.29 | 0.28 | 0.23 | 0.28 |
| Angle of repose | Degrees | 43 | 44 | 49 | 50 | 51 | 50 |
|  | Powder fluidity test | 4 | 3 | 1 | 2 | 1 | 1 |
| (2) Evaluation of molded article | | | | | | | |
| Haze value | | 7 | 10 | 9 | 10 | 11 | 12 |
| Evaluation of white spots | | Excellent | Good | Good | Good | Good | Excellent |

Example 13

The fine particle-form crystal nucleating agent for polyolefin resins (DMDBS) obtained in Example 7 was pulverized again under the same conditions as those in Example 7 to prepare a finer particle-form crystal nucleating agent for polyolefin resins. The finer particle-form crystal nucleating agent was mixed with DMDBS before pulverization at the ratio shown in Table 4, followed by volume-reducing treatment as in Example 7. Thus, the crystal nucleating agent for polyolefin resins of the present invention was obtained. The obtained crystal nucleating agent for polyolefin resins was ratio, the bulk density, and the angle of repose and evaluation of the powder fluidity. Table 4 shows the results. Subsequently, a polypropylene resin molded article was obtained as in Example 7 using the crystal nucleating agent for polyolefin resins. Measurement of the haze value and evaluation of white spots were performed using the obtained molded article. Table 4 shows the results.

Example 15

The finer particle-form crystal nucleating agent (DMDBS) obtained in Example 7 and unpulverized CDBS (average particle size: 7.5, particle size uniformity: 4.1) were mixed at the ratio shown in Table 4, followed by volume-reducing treatment as in Example 7. Thus, the crystal nucleating agent for polyolefin resins of the present invention was obtained. The obtained crystal nucleating agent for polyolefin resins was subjected to measurement of the particle size distribution, the aspect ratio, the bulk density, and the angle of repose and evaluation of the powder fluidity. Table 4 shows the results. Subsequently, a polypropylene resin molded article was obtained as in Example 7 using the crystal nucleating agent for polyolefin resins. Measurement of the haze value and evaluation of white spots were performed using the obtained molded article. Table 4 shows the results.

TABLE 4

| | | Example | | |
|---|---|---|---|---|
| | | 13 | 14 | 15 |
| Type of crystal nucleating agent B | | DMDBS | DMDBS | DMDBS |
| Type of crystal nucleating agent (C) | | DMDBS | EDBS | CDBS |
| (B)/(C) ratio | | 2/1 | 2/1 | 2/1 |
| (1) Characteristics of crystal nucleating agent for polyolefin resins | | | | |
| Particle size distribution | Average (μm) | 2.2 | 2.5 | 2.0 |
| | Uniformity | 6.4 | 6.3 | 6.1 |
| Aspect ratio | 50% value | 0.62 | 0.58 | 0.59 |
| | Lower value | 0.31 | 0.32 | 0.29 |
| Bulk density | Aerated bulk density (g/cm$^3$) | 0.30 | 0.28 | 0.29 |
| | Packed bulk density (g/cm$^3$) | 0.38 | 0.40 | 0.38 |
| Angle of repose | Degrees | 41 | 43 | 42 |
| Powder fluidity test | | 5 | 5 | 5 |
| 2) Evaluation of molded article | | | | |
| Haze value | | 8 | 9 | 9 |
| Evaluation of white spots | | Excellent | Excellent | Excellent |

The results in Table 3 and Table 4 show that the crystal nucleating agents for polyolefin resins having characteristics within the scope of the present invention (Examples 7 to 15) have very excellent powder fluidity as compared with the crystal nucleating agents for polyolefin resins having characteristics outside the scope of the present invention (Comparative Examples 5 to 10). The results in Table 3 and Table 4 also show that the crystal nucleating agent for polyolefin resins of the present invention has very excellent dispersibility or solubility in resin and is equal to or greater than conventional crystal nucleating agents for polyolefin resins in terms of the original performance as a crystal nucleating agent for polyolefin resins. These results show that use of the crystal nucleating agent for polyolefin resins of the present invention greatly improves workability upon blending with a polyolefin resin and during the molding after the blending. The results further show that the polyolefin resin composition and the molded article thereof containing the crystal nucleating agent for polyolefin resins of the present invention have very excellent performance and are very useful in various applications.

Example 16

A Henschel mixer was charged with 10 kg of DMDBS having a common particle size (GEL ALL DXR available from New Japan Chemical Co., Ltd.) as a crystal nucleating agent (A) and 0.5 kg of StCa having a common particle size (Ca-St available from Nitto Kasei Co., Ltd.) as a fluidity improver. They were mixed for 30 seconds at room temperature to prepare a mixture containing the crystal nucleating agent (A) and the fluidity improver. The obtained mixture was pulverized to a particle size distribution within the scope of the present invention with a jet pulverizer "Single Track Jet Mill STJ--400" available from Seishin Enterprise Co., Ltd, at room temperature under the conditions of a pressure of 0.7 MPa and a throughput of 30 kg/hour. Thus, a fine particle-form mixture was prepared. Subsequently, the fine particle-form mixture was put in a simple compression volume reduction container and pressurized at 0.25 MPa at room temperature, whereby volume-reducing treatment was performed to achieve the aerated bulk density shown in Table 5. Thus, a crystal nucleating agent for polyolefin resins with improved fluidity of the present invention was obtained. The obtained crystal nucleating agent for polyolefin resins of the present invention was subjected to measurement of the particle size distribution. Table 5 shows the average and the uniformity determined from the particle size distribution. The bulk density (aerated bulk density and packed bulk density) of the crystal nucleating agent for polyolefin resins was also measured. Table 5 shows the results. Subsequently, the angle of repose of the obtained crystal nucleating agent for polyolefin resins was measured, and the evaluation of the powder fluidity was performed by the powder fluidity test (funnel test). Table 5 shows the results.

Next, 100 parts by weight of a polypropylene random copolymer (MFR=7 g/10 min (load: 2160 g, temperature: 230° C.), R-720 available from Prime Polymer Co., Ltd.) as a polyolefin resin, 0.2 parts by weight of the crystal nucleating agent for polyolefin resin obtained above, and 0.04 parts by weight of StCa (available from Nitto Kasei Co., Ltd., product name: "Ca-St"), 0.05 parts by weight of tetrakis[methylene-3-(3,5-di-tert-butyl-4-hydroxyphenyl)propionate]methane (available from BASF Japan Ltd., product name: "IRGANOX1010"), and 0.05 parts by weight of tetrakis(2,4-di-tent-butylphenyl)phosphite (available from BASF Japan Ltd., product name: "IRGAFOS168") as other additives were dry-blended. The dry-blended mixture was melted and mixed using a single screw extruder (VS-20 available from Tanabe Plastics Machinery Co., Ltd.) at a barrel temperature of 250° C., and the extruded strands were cooled and cut using a pelletizer.

Thus, a polyolefin resin composition was prepared.

Next, the obtained polyolefin resin composition was molded using an injection molding apparatus (NS40-5A available from Nissei Plastic Industrial Co., Ltd.) under the conditions of an injection molding temperature (heating temperature) of 240° C. and a die temperature (cooling temperature) of 40° C. to provide a 1-mm-thick polyolefin resin molded article. The haze value of the obtained molded article as an evaluation sample was measured. The evaluation of white spots was also performed using the same evaluation sample. Table 5 shows the results.

Example 17

The crystal nucleating agent for polyolefin resins of the present invention was obtained as in Example 16 except that the amount of the fluidity improver added was changed to 1 kg. The obtained crystal nucleating agent for polyolefin resins was subjected to measurement of the particle size distribution, the bulk density, and the angle of repose and evaluation of the powder fluidity. Table 5 shows the results.

Subsequently, a polypropylene resin molded article was obtained as in Example 16 using the obtained crystal nucleating agent for polyolefin resins. Measurement of the haze value and evaluation of white spots were performed using the obtained molded article. Table 5 shows the results.

Example 18

The crystal nucleating agent for polyolefin resins of the present invention was obtained as in Example 16 except that the amount of the fluidity improver added was changed to 1.5 kg. The obtained crystal nucleating agent for polyolefin resins was subjected to measurement of the particle size distribution, the bulk density, and the angle of repose and evaluation of the powder fluidity. Table 5 shows the results. Subsequently, a polypropylene resin molded article was obtained as in Example 16 using the obtained crystal nucleating agent for polyolefin resins. Measurement of the haze value and evaluation of white spots were performed using the obtained molded article. Table 5 shows the results.

Example 19

The crystal nucleating agent for polyolefin resins of the present invention was obtained as in Example 17 except that StZn having a common particle size (Zn-St available from Nitto Kasei Co., Ltd.) was used as a fluidity improver instead of StCa. The obtained crystal nucleating agent for polyolefin resins was subjected to measurement of the particle size distribution, the bulk density, and the angle of repose and evaluation of the powder fluidity. Table 5 shows the results. Subsequently, a polypropylene resin molded article was obtained as in Example 16 using the obtained crystal nucleating agent for polyolefin resins. Measurement of the haze value and evaluation of white spots were performed using the obtained molded article. Table 5 shows the results.

Example 20

The crystal nucleating agent for polyolefin resins of the present invention was obtained as in Example 16 except that silica having a common particle size (AEROSIL (registered trademark) R972 available from EVONIK) was used as a fluidity improver instead of StCa. The obtained crystal nucleating agent for polyolefin resins was subjected to measurement of the particle size distribution, the bulk density, and the angle of repose and evaluation of the powder fluidity. Table 5 shows the results. Subsequently, a polypropylene resin molded article was obtained as in Example 16 using the obtained crystal nucleating agent for polyolefin resins. Measurement of the haze value and evaluation of white spots were performed using the obtained molded article. Table 5 shows the results.

Example 21

The crystal nucleating agent for polyolefin resins of the present invention was obtained as in Example 18 except that PDBN was used as the crystal nucleating agent (A) instead of DMDBS. The obtained crystal nucleating agent for polyolefin resins was subjected to measurement of the particle size distribution, the bulk density, and the angle of repose and evaluation of the powder fluidity. Table 5 shows the results. Subsequently, a polypropylene resin molded article was obtained as in Example 16 using the obtained crystal nucleating agent for polyolefin resins. Measurement of the haze value and evaluation of white spots were performed using the obtained molded article. Table 5 shows the results.

Comparative Example 11

In Example 16, the crystal nucleating agent (A) was pulverized under the same conditions as those in Example 16 without addition of the fluidity improver. Thus, a fine particle-form crystal nucleating agent for polyolefin resins was obtained. The obtained fine particle-form crystal nucleating agent for polyolefin resins was subjected to measurement of the particle size distribution, the bulk density, and the angle of repose and evaluation of the powder fluidity. Table 5 shows the results. Subsequently, a polypropylene resin molded article was obtained as in Example 16 using the obtained crystal nucleating agent for polyolefin resins. Measurement of the haze value and evaluation of white spots were performed using the obtained molded article. Table 5 shows the results.

Comparative Example 12

In Example 16, the crystal nucleating agent (A) was used as it was without addition of the fluidity improver, pulverization, or volume reduction. As in Example 16, the crystal nucleating agent (A) was subjected to measurement of the particle size distribution, the bulk density, and the angle of repose and evaluation of the powder fluidity. Table 5 shows the results. Subsequently, a polypropylene resin molded article was obtained as in Example 16 using the obtained crystal nucleating agent for polyolefin resins. Measurement of the haze value and evaluation of white spots were performed using the obtained molded article. Table 5 shows the results.

Comparative Example 13

The mixture obtained in Example 17 containing the crystal nucleating agent (A) and the fluidity improver was used as it was without pulverization or volume reduction. As in Example 16, the mixture was subjected to measurement of the particle size distribution, the bulk density, and the angle of repose and evaluation of the powder fluidity. Table 5 shows the results. Subsequently, a polypropylene resin molded article was obtained as in Example 16 using the obtained crystal nucleating agent for polyolefin resins. Measurement of the haze value and evaluation of white spots were performed using the obtained molded article. Table 5 shows the results.

Comparative Example 14

In Example 21, the crystal nucleating agent (A) was used as it was without addition of the fluidity improver, pulverization, or volume reduction. As in Example 21, the crystal nucleating agent (A) was subjected to measurement of the particle size distribution, the bulk density, and the angle of repose and evaluation of the powder fluidity. Table 5 shows the results. Subsequently, a polypropylene resin molded article was obtained as in Example 16 using the obtained crystal nucleating agent. Measurement of the haze value and evaluation of white spots were performed. using the obtained molded article. Table 5 shows the results.

TABLE 5

|  |  | Example | | | | | | Comparative Example | | | |
|---|---|---|---|---|---|---|---|---|---|---|---|
|  |  | 16 | 17 | 18 | 19 | 20 | 21 | 11 | 12 | 13 | 14 |
| Type of crystal nucleating agent (A) | | DMDBS | DMDBS | DMDBS | DMDBS | DMDBS | PDBN | DMDBS | DMDBS | DMDBS | PDBN |
| Fluidity improved | | StCa | StCa | StCa | StZn | Silica | StCa | — | — | StCa | — |
| Crystal nucleating agent (A)/ fluidity improver (weight ratio) | | 100/5 | 100/10 | 100/15 | 100/10 | 100/5 | 100/15 | — | — | 100/10 | — |
| (1) Characteristics of crystal nucleating agent for polyolefin resins | | | | | | | | | | | |
| Particle size distribution | Average (μm) | 1.8 | 1.7 | 1.9 | 1.7 | 2.3 | 1.6 | 1.6 | 6.2 | 5.9 | 5.9 |
| | Uniformity | 4.9 | 4.8 | 5.0 | 4.9 | 6.3 | 5.3 | 5.2 | 3.4 | 3.6 | 4.6 |
| Bulk density | Aerated bulk density (g/cm$^3$) | 0.29 | 0.28 | 0.29 | 0.31 | 0.25 | 0.28 | 0.18 | 0.21 | 0.21 | 0.21 |
| | Packed bulk density (g/cm$^3$) | 0.40 | 0.39 | 0.39 | 0.40 | 0.35 | 0.38 | 0.26 | 0.35 | 0.29 | 0.28 |
| Angle of repose | Degrees | 40 | 40 | 39 | 41 | 38 | 41 | 44 | 45 | 42 | 50 |
| Powder fluidity test | | 5 | 5 | 5 | 5 | 5 | 5 | 2 | 1 | 2 | 1 |
| (2) Evaluation of molded article | | | | | | | | | | | |
| Haze value | | 8 | 8 | 9 | 7 | 9 | 12 | 8 | 10 | 11 | 12 |
| Evaluation of white spots | | Excellent | Excellent | Excellent | Excellent | Excellent | Excellent | Excellent | Good | Good | Excellent |

Example 22

DMDBS having a common particle size (GEL ALL DXR available from New Japan Chemical Co., Ltd, was pulverized with a jet pulverizer "Single Track Jet Mill STJ-400" available from Seishin Enterprise Co., Ltd. at room temperature under the conditions of a pressure of 0.7 MPa and a throughput of 30 kg/hour. Thus, a fine particle-form crystal nucleating agent (A) was obtained. The obtained crystal nucleating agent (A) had an average particle size of 1.6 μm, a particle size uniformity of 5.2, a 50% value of the aspect ratio of 0.62, and a lower value of the aspect ratio of 0.31.

Similarly, StCa having a common particle size (Ca-St available from Nitto Kasei Co., Ltd.) was pulverized with the jet pulverizer at room temperature under the conditions of a pressure of 0.7 MPa and a throughput of 30 kg/hour. Thus, a fine particle-form fluidity improver was obtained. The obtained fluidity improver had an average particle size of 2.1 μm and a particle size uniformity of 2.7.

Subsequently, 50 g of the obtained fine particle form crystal nucleating agent (A) and 5 g of the obtained fine particle-form fluidity improver were put in a commercially available food processor mixed for 30 seconds a room temperature. Thus, a fine particle-form mixture containing the crystal nucleating agent (A) and the fluidity improver was obtained.

Then, the fine particles-form mixture was put in a simple compression volume reduction container and pressurized at 0.25 MPa at room temperature, whereby volume-reducing treatment was performed to achieve the aerated bulk density shown in Table 6. Thus, a crystal nucleating agent for polyolefin resins with improved fluidity according to the present invention was obtained. The obtained crystal nucleating agent for polyolefin resins was subjected to measurement of the particle size distribution, the bulk density, and the angle of repose and evaluation of the powder fluidity. Table 6 shows the results. Subsequently, a polypropylene resin molded article was obtained as in Example 16 using the obtained crystal nucleating agent for polyolefin resins. Measurement of the haze value and evaluation of white spots were performed using the obtained molded article. Table 6 shows the results.

Example 23

A crystal nucleating agent for polyolefin resins with improved fluidity according to the present invention was obtained as in Example 22 except that the amount of the fine particle-form fluidity improver added was changed to 7.5 g. The obtained crystal nucleating agent for polyolefin resins was subjected to measurement of the particle size distribution, the bulk density, and the angle of repose and evaluation of the powder fluidity. Table 6 shows the results. Subsequently, a polypropylene resin molded article was obtained as in Example 16 using the obtained crystal nucleating agent for polyolefin resins. Measurement of the haze value and evaluation of white spots were performed using the obtained molded article. Table 6 shows the results.

Example 24

PDBN having a common particle size was pulverized with the jet pulverizer at room temperature under the conditions of a pressure of 0.7 MPa and a throughput of 30 kg/hour. Thus, a fine particle-form crystal nucleating agent (A) was obtained. The obtained crystal nucleating agent (A) had an average particle size of 1.4 μm and a particle size uniformity of 5.3.

Subsequently, 50 g of the obtained fine particle-form crystal nucleating agent (A) and 5 g of the obtained fine particle-form fluidity improver obtained in. Example 22 were put in a commercially available food processor and mixed for 30 seconds at room temperature. Thus, a crystal nucleating agent for polyolefin resins was obtained as a fine particle-form mixture containing the crystal nucleating agent (A) and the fluidity improver.

The obtained crystal nucleating agent for polyolefin resins was subjected to measurement of the particle size distribution, the bulk density, and the angle of repose and evaluation of the powder fluidity. Table 6 shows the results. Subsequently, a polypropylene resin molded article was obtained as in Example 16 using the obtained crystal nucleating agent for polyolefin resins. Measurement of the haze value and evaluation of white spots were performed using the obtained molded article. Table 6 shows the results.

TABLE 6

| | | | Example 22 | Example 23 | Example 24 |
|---|---|---|---|---|---|
| Crystal nucleating agent (A) | Type | | DMDBS | DMDBS | PDBN |
| | Particle size distribution | Average (μm) | 1.6 | 1.6 | 1.4 |
| | | Uniformity | 5.2 | 5.2 | 5.3 |
| | Aspect ratio | 50% value | 0.62 | 0.62 | 0.54 |
| | | Lower value | 0.31 | 0.31 | 0.35 |
| Fluidity improver | Type | | StCa | StCa | StCa |
| | Particle size distribution | Average (μm) | 2.1 | 2.1 | 2.1 |
| | | Uniformity | 2.7 | 2.7 | 2.7 |
| Crystal nucleating agent (A)/fluidity improver (weight ratio) | | | 100/10 | 100/15 | 100/10 |
| (1) Characteristics of crystal nucleating agent for polyolefin resins | | | | | |
| Particle size distribution | Average (μm) | | 1.7 | 1.7 | 2.0 |
| | uniformity | | 5.2 | 5.3 | 6.1 |
| | Aerated bulk density (g/cm$^3$) | | 0.30 | 0.31 | 0.29 |
| Bulk density | Packed bulk density (g/cm$^3$) | | 0.40 | 0.41 | 0.38 |
| Angle of repose | Degrees | | 40 | 39 | 41 |
| | Powder fluidity test | | 5 | 5 | 5 |
| (2) Evaluation of molded article | | | | | |
| | Haze value | | 8 | 9 | 9 |
| | Evaluation of white spots | | Excellent | Excellent | Excellent |

The results in Table 5 and Table 6 show that the crystal nucleating agents for polyolefin resins having characteristics within the scope of the present invention (Examples 16 to 24) have very excellent powder fluidity as compared with the crystal nucleating agents for polyolefin resins having characteristics outside the scope of the present invention (Comparative Examples 11 to 14). The results in Table 5 and Table 6 also show that the crystal nucleating agent for polyolefin resins of the present invention has very excellent dispersibility or solubility in resin and is equal to or greater than conventional crystal nucleating agents in terms of the original performance as a crystal nucleating agent for polyolefin resins. These results show that use of the crystal nucleating agent for polyolefin resins of the present invention greatly improves workability upon blending with a polyolefin resin and during the molding after the blending. The results further show that the polyolefin resin composition and the molded article thereof containing the crystal nucleating agent for polyolefin resins of the present invention have very excellent performance and are very useful in various applications.

INDUSTRIAL APPLICABILITY

The crystal nucleating agent for polyolefin resins of the present invention has remarkably better fluidity as a result of adjustment to achieve specific characteristics, and is usable for various applications as a crystal nucleating agent for polyolefin resins having very high fluidity. The crystal nucleating agent for polyolefin resins of the present invention is equal to or greater than conventional crystal nucleating agents for polyolefin resins in terms of the original performance as a crystal nucleating agent for polyolefin resin, such as the transparency of the resulting molded article. Accordingly, the crystal nucleating agent for polyolefin resins of the present invention is usable for various applications including automobile parts, electric parts, machine components, commodities, cases for cloths or the like, and containers for food or the like. In particular, in medical applications where incorporation of unwanted additives or the like should be avoided, the present invention provides a technique that is greatly expected to be utilized as a technique capable of improving the fluidity without addition of additives.

The invention claimed is:

1. A crystal nucleating agent for polyolefin resins, the crystal nucleating agent at least comprising a crystal nucleating agent (A), wherein the crystal nucleating agent (A) is a mixture of a crystal nucleating agent (B) having an average particle size of 0.5 to 2.0 μm as determined by laser diffraction particle size distribution measurement and a crystal nucleating agent (C) having an average particle size of 4.0 to 15.0 μm as determined by laser diffraction particle size distribution measurement, and wherein the crystal nucleating agent for polyolefin resins has an average particle size of 0.5 to 4.0 μm and a particle size uniformity of 3 to 10 as determined by laser diffraction particle size distribution measurement.

2. The crystal nucleating agent for polyolefin resins according to claim 1, wherein the crystal nucleating agent (A) has a 50% value of an aspect ratio of 0.40 to 0.70 and a lower value of the aspect ratio of 0.2 to 0.4 as determined by particle image analysis.

3. The crystal nucleating agent for polyolefin resins according to claim 1, which is a pulverized product prepared with a jet pulverizer.

4. The crystal nucleating agent for polyolefin resins according to claim 1, wherein the crystal nucleating agent (B) is a pulverized product prepared with a jet pulverizer.

5. The crystal nucleating agent for polyolefin resins according to claim 1, wherein at least one of the crystal nucleating agent (B) or the crystal nucleating agent (C) is a diacetal compound represented by the formula (1):

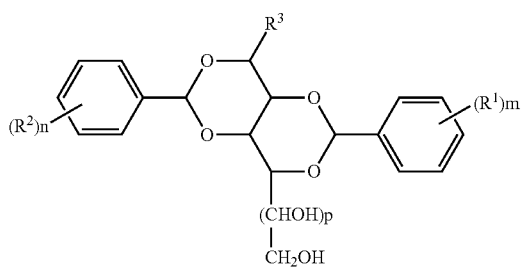

wherein $R^1$ and $R^2$ are the same as or different from each other and each represent a hydrogen atom, a C1-C4 linear or branched alkyl group, a C1-C4 linear or branched alkoxy group, a C1-C4 linear or branched alkoxy carbonyl group, or a halogen atom; $R^3$ represents a hydrogen atom, a C1-C4 linear or branched alkyl group, a C2-C4 linear or branched alkenyl group, or a C1-C4 linear or branched hydroxy alkyl group; m and n each represent an integer of 1 to 5; p represents 0 or 1; and two $R^1$s optionally bind to each other to form a tetralin ring together with a benzene ring to which they are bonded and two $R^2$s optionally bind to each other to form a tetralin ring together with a benzene ring to which they are bonded.

6. The crystal nucleating agent for polyolefin resins according to claim 5,
wherein, in the formula (1), $R^1$ and $R^2$ are the same as or different from each other and each represent a methyl group or an ethyl group, $R^3$ represents a hydrogen atom, m and n each represent an integer of 1 or 2, and p represents 1.

7. The crystal nucleating agent for polyolefin resins according to claim 5,
wherein, in the formula (1), $R^1$ and $R^2$ are the same as or different from each other and each represent a propyl group or a propoxy group, $R^3$ represents a propyl group or a propenyl group, m and n each represent 1, and p represents 1.

8. The crystal nucleating agent for polyolefin resins according to claim 1, having an aerated bulk density of 0.20 g/cm³ or higher and a packed bulk density of 0.30 g/cm³ or higher.

9. The crystal nucleating agent for polyolefin resins according to claim 8, which is a volume-reduced product of a pulverized product prepared with a jet pulverizer.

10. The crystal nucleating agent for polyolefin resins according to claim 1, further comprising a fluidity improver,
wherein the fluidity improver is at least one selected from the group consisting of a metal salt of a C8-C32 saturated or unsaturated fatty acid, a C14-C32 saturated or unsaturated fatty acid, a C14-C28 saturated or unsaturated aliphatic alcohol, a bisamide of a C12-C32 saturated or unsaturated fatty acid, silica, talc, calcium carbonate, and hydrotalcite.

11. The crystal nucleating agent for polyolefin resins according to claim 10,
wherein the fluidity improver contains a metal salt of a C8-C32 saturated or unsaturated fatty acid and/or silica.

12. A method for producing a crystal nucleating agent for polyolefin resins, wherein the crystal nucleating agent (A) is a mixture of a crystal nucleating agent (B) having an average particle size of 0.5 to 2.0 μm as determined by laser diffraction particle size distribution measurement and a crystal nucleating agent (C) having an average particle size of 4.0 to 15.0 μm as determined by laser diffraction particle size distribution measurement, comprising:
(i) pulverization with a jet pulverizer to an average particle size of 0.5 to 4.0 μm and a particle size uniformity of 3 to 10.

13. The method for producing a crystal nucleating agent for polyolefin resins according to claim 12, comprising:
(ii) subjecting the pulverized product obtained in the step (i) to volume-reducing treatment to an aerated bulk density of 0.20 g/cm³ or higher and a packed bulk density of 0.30 g/cm³ or higher.

14. The method for producing a crystal nucleating agent for polyolefin resins according to claim 12,
wherein in the step (i), a crystal nucleating agent (A) in the obtained pulverized product has a 50% value of an aspect ratio of 0.40 to 0.70 and a lower value of the aspect ratio of 0.2 to 0.4 as determined by particle image analysis.

15. The method for producing a crystal nucleating agent for polyolefin resins according to claim 14, comprising, before the step (i), mixing an unpulverized crystal nucleating agent (A), an unpulverized fluidity improver, and optionally an additive for polyolefin resins other than the crystal nucleating agent and the fluidity improver.

16. The method for producing a crystal nucleating agent for polyolefin resins according to claim 14, comprising, between the step (i) and the step (ii), the following steps (i-1) and (i-2):
(i-1) pulverizing a fluidity improver to an average particle size of 5μm or smaller and a particle size uniformity of 3 or lower; and
(i-2) mixing the pulverized product obtained in the step (i), the pulverized fluidity improver obtained in the step (i-1), and optionally an additive for polyolefin resins other than the crystal nucleating agent and the fluidity improver.

17. A polyolefin resin composition comprising:
a polyolefin resin; and
the crystal nucleating agent for polyolefin resins according to claim 1.

18. A method for improving the fluidity of a crystal nucleating agent for polyolefin resins, comprising:
adjusting an average particle size of a crystal nucleating agent for polyolefin resins that contains a crystal nucleating agent (A) and a fluidity improver to 0.5 to 4 μm and a particle size uniformity of the crystal nucleating agent for polyolefin resins to 3 to 10;
wherein the crystal nucleating agent (A) is a mixture of a crystal nucleating agent (B) having an average particle size of 0.5 to 2.0 μm as determined by laser diffraction particle size distribution measurement and a crystal nucleating agent (C) having an average particle size of 4.0 to 15.0 μm as determined by laser diffraction particle size distribution measurement and adjusting an aerated bulk density of the crystal nucleating agent for polyolefin resins to 0.20 g/cm³ or higher and a packed bulk density of the crystal nucleating agent for polyolefin resins to 0.30 g/cm³ or higher.

19. The method for improving the fluidity of a crystal nucleating agent for polyolefin resins according to claim 18, comprising:
pulverizing the crystal nucleating agent for polyolefin resins containing a crystal nucleating agent (A) and a fluidity improver with a jet pulverizer; and
subjecting the pulverized product to volume-reducing treatment.

* * * * *